United States Patent
Augenbraun et al.

(10) Patent No.: US 12,397,440 B1
(45) Date of Patent: Aug. 26, 2025

(54) ROBOT FOR PERFORMING DEXTROUS TASKS AND RELATED METHODS AND SYSTEMS

(71) Applicants: Joseph E. Augenbraun, Redwood City, CA (US); Ashis Ghosh, San Francisco, CA (US); Stephen J. Hansen, San Francisco, CA (US); Achille Verheye, San Francisco, CA (US); Dalia MacPhee, Los Angeles, CA (US); Lief Terry, Decatur, GA (US); Fang-Ting Kao, Oakland, CA (US); Edmund Kelly Friese, Eugene, OR (US)

(72) Inventors: Joseph E. Augenbraun, Redwood City, CA (US); Ashis Ghosh, San Francisco, CA (US); Stephen J. Hansen, San Francisco, CA (US); Achille Verheye, San Francisco, CA (US); Dalia MacPhee, Los Angeles, CA (US); Lief Terry, Decatur, GA (US); Fang-Ting Kao, Oakland, CA (US); Edmund Kelly Friese, Eugene, OR (US)

(*) Notice: Subject to any disclaimer, the term of this patent is extended or adjusted under 35 U.S.C. 154(b) by 314 days.

(21) Appl. No.: 17/858,723

(22) Filed: Jul. 6, 2022

Related U.S. Application Data

(63) Continuation-in-part of application No. 16/709,257, filed on Dec. 10, 2019, now Pat. No. 11,407,118.

(60) Provisional application No. 62/777,627, filed on Dec. 10, 2018.

(51) Int. Cl.
*B25J 11/00* (2006.01)
*B25J 9/16* (2006.01)
*G05D 1/00* (2006.01)

(52) U.S. Cl.
CPC .......... *B25J 11/0085* (2013.01); *B25J 9/162* (2013.01); *G05D 1/0214* (2013.01); *G05B 2219/39001* (2013.01)

(58) Field of Classification Search
CPC ..... B25J 11/0085; B25J 9/162; G05D 1/0214; G05B 2219/39001
USPC .......................................................... 700/253
See application file for complete search history.

(56) References Cited

U.S. PATENT DOCUMENTS

| | | | |
|---|---|---|---|
| 9,827,677 B1* | 11/2017 | Gilbertson | A47L 11/24 |
| 10,500,735 B1* | 12/2019 | Menon | B25J 15/0061 |
| 2018/0204431 A1* | 7/2018 | Meyer | G05D 1/0255 |
| 2018/0281012 A1* | 10/2018 | Telleria | B24B 49/12 |
| 2018/0361581 A1* | 12/2018 | Williams | A47L 11/00 |
| 2019/0246858 A1* | 8/2019 | Karasikov | A47L 9/2894 |
| 2019/0389074 A1* | 12/2019 | High | B25J 19/023 |
| 2020/0069140 A1* | 3/2020 | Orzechowski | G05D 1/0016 |

* cited by examiner

*Primary Examiner* — Kira Nguyen
(74) *Attorney, Agent, or Firm* — Richard Eldredge; Leavitt Eldredge Law Firm

(57) ABSTRACT

A robot having a transportation assembly, a robotic arm, and control systems is disclosed. A positioning control system for the robot is configured to communicate with the transportation assembly to provide commands to the transportation assembly such that the robot moves to a plurality of stations or along a path during the task. A robotic arm control system for the robot is configured to communicate with the robotic arm to provide commands to the robotic arm such that the robotic arm performs a series of operations to complete a task specific to a station or along the path.

14 Claims, 12 Drawing Sheets

ROBOT FOR PERFORMING DEXTROUS TASKS AND RELATED METHODS AND SYSTEMS

BACKGROUND

1. Field of the Invention

Embodiments of the present invention relate to robotics, and more particularly to cleaning robots.

2. Description of Related Art

Currently hotel rooms, office buildings and other buildings and various indoor and outdoor facilities, etc. are cleaned manually employing human labor. Automation of such tasks that do not require human labor is not currently available even though the cost are very high and are only expected to increase as the cost of human labor increases. There thus remains a need for improved robots for cleaning.

SUMMARY OF INVENTION

An embodiment of the current invention is directed to a robot that includes a transportation assembly; a robotic arm attached to the transportation assembly; a positioning control system configured to communicate with the transportation assembly to provide commands to the transportation assembly such that the robot moves to at least one of a plurality of stations in a room that require a task to be performed or along a path in the room during the task; and a robotic arm control system configured to communicate with the robotic arm to provide commands to the robotic arm such that the robotic arm performs a series of operations to complete a task specific to a particular one of the at least one of the plurality of stations or along the path.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

Figure 1:
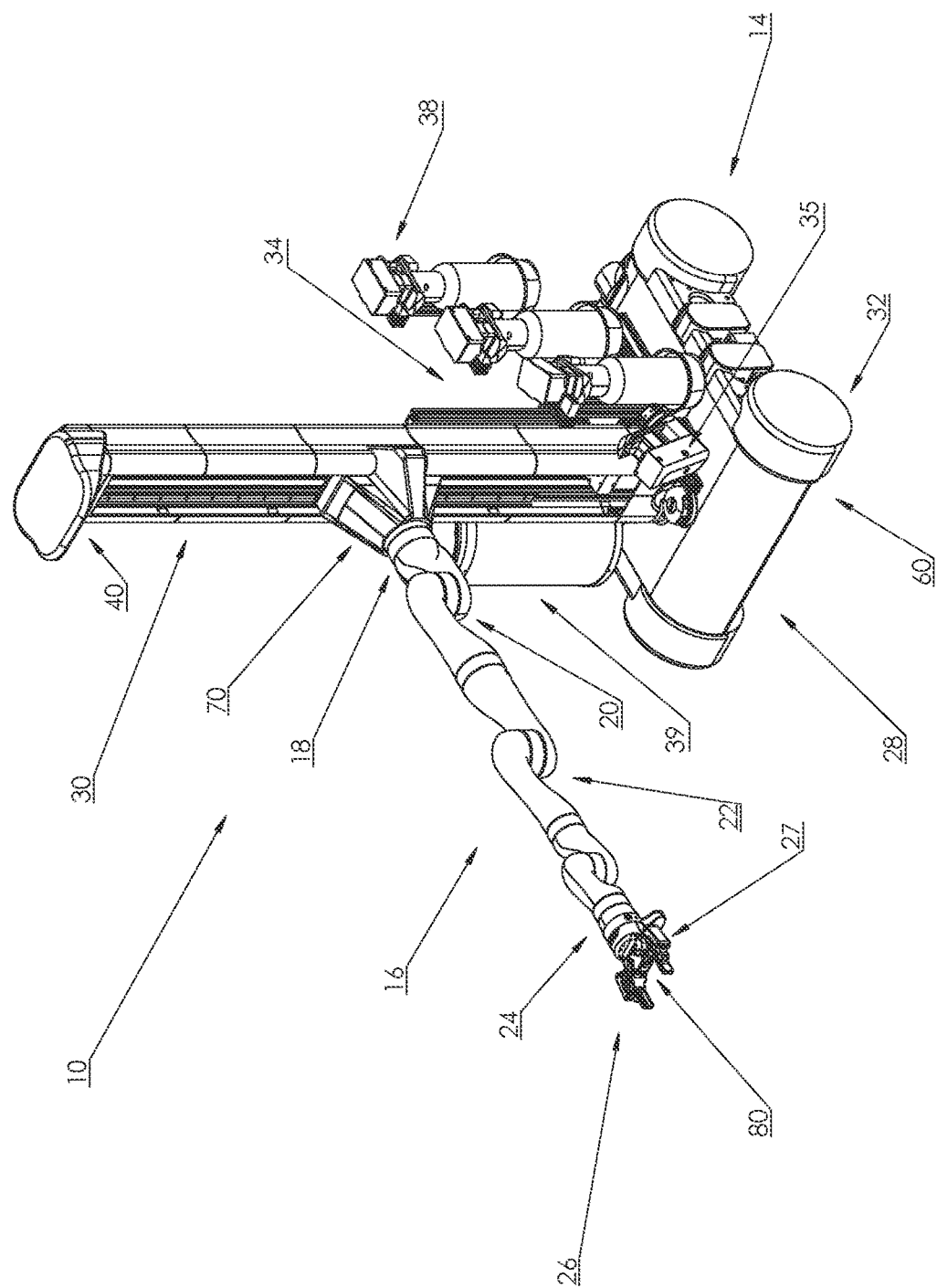
FIG. 1 illustrates an embodiment of a robot that is configured to perform the task of cleaning.

While the system and method of use of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

DETAILED DESCRIPTION OF THE PREFERRED EMBODIMENT

Embodiments of the invention are discussed in detail below. In describing embodiments, specific terminology is employed for the sake of clarity. However, the invention is not intended to be limited to the specific terminology so selected. A person skilled in the relevant art will recognize that other equivalent parts can be employed and other methods developed without departing from the spirit and scope of the invention.

As used herein, the term "about" or "approximately" when referring to a measurable value such as an amount, a temporal duration, and the like, is meant to encompass variations of +20% or +10%, more preferably +5%, even more preferably +1%, and still more preferably +0.1% from the specified value, as such variations are appropriate to perform the disclosed methods.

Robot and Tools

FIG. 1 is an illustration of a robot 10 according to an embodiment of the current invention. The robot 10 includes a transportation assembly 14, and a robotic arm 16. In some embodiments, the robotic arm 16 may be an articulated robotic arm configured to have one or more joints such as, but not limited to joints 18, 20, 22, 24. In some embodiments, the robotic arm 16 can also include a gripper assembly 26 configured so that the robot 10 is able to grasp and/or perform other functions. The robotic arm 16 may have one or a plurality of joints, for example joints 18, 20, 22, and 24, that are configured to move the arm into different positions. An actuating mechanism, or a plurality of actuating mechanisms, may be used to move or articulate the joints to move the arm between positions, such as a non-use position and a use-position. The actuating mechanism for the arm or each joint may be a motor, a step motor, hydraulic, pneumatic, other robotic arm actuating mechanism, or combinations thereof.

According to an embodiment, at a distal end thereof, the robotic arm 16 may include, for example, a gripper 26 or gripper assembly configured to grasp and perform other functions, as described in more detail below. According to an embodiment, the gripper 26 may comprise a hand having a set of fingers which can be articulated to grasp and perform other functions, as described in more detail below. According to an embodiment, the gripper assembly 26 may be configured with other movable parts which can be manipulated to grip or grasp an object. For example, the fingers 27 or movable parts may have one or a plurality of joints that are configured to move to place the gripper into a grasping position or into different positions.

In some embodiments, an actuating mechanism, or a plurality of actuating mechanisms, may be used to move or articulate the joints or movable parts to move the gripper between positions, such as a non-grasping position or positions and a grasping-position or positions. As known to one of ordinary skill in the art, the actuating mechanism for the gripper or each joint may be a motor, a step motor, hydraulic, pneumatic, other robotic arm actuating mechanism, or combinations thereof known to one of ordinary skill in the art.

According to an embodiment, the robot 10 may comprise a base 28 having lower platform and a housing for electronics equipment, such as computing device 100 described below, and a power system. The base 28 may further include a conveyor 30 which is configured to carry the arm, as depicted in FIG. 1. The conveyor 30, wheels 32, robotic arm 16, and fingers 27 may be motorized and controlled by the computing device 100 for carrying out base movement and navigation, arm movement, finger grasping, and other tasks, as explained in more detail below.

In general, the base 28 may be sized so that it provides stability for movement of the robotic arm 16. However, if the base 28 is small relative to the height of the position where the robotic arm 16 is mounted, the base of the arm will move and/or wobble during operation. If the base of the arm is moving and/or wobbling while the robotic arm 16 is reaching for and/or manipulating an object, a grasp and/or manipulation that is planned before the arm is moved may fail because the end of the arm moves through a path that is different than expected. As described in more detail below, the gripper may be configured to dynamically adjust to wobbling or movement of the base.

Figure 2:
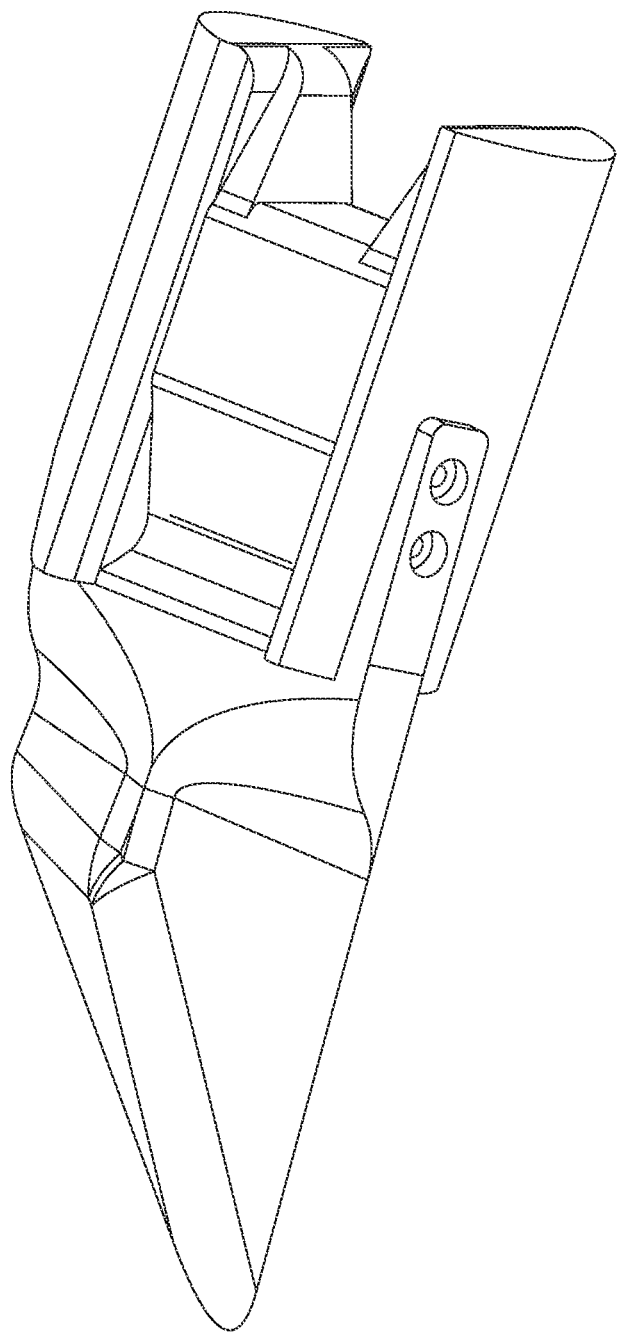
FIG. 2 illustrates a toilet seat lifter cleaning tool according to the embodiment of FIG. 1.
Figure 3:
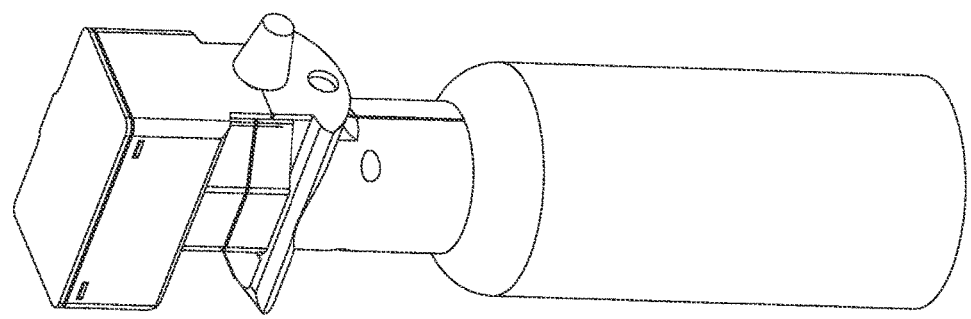
FIG. 3 illustrates a sprayer tool according to the embodiment of FIG. 1.
Figure 3:
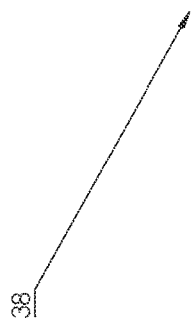
Figure 4:
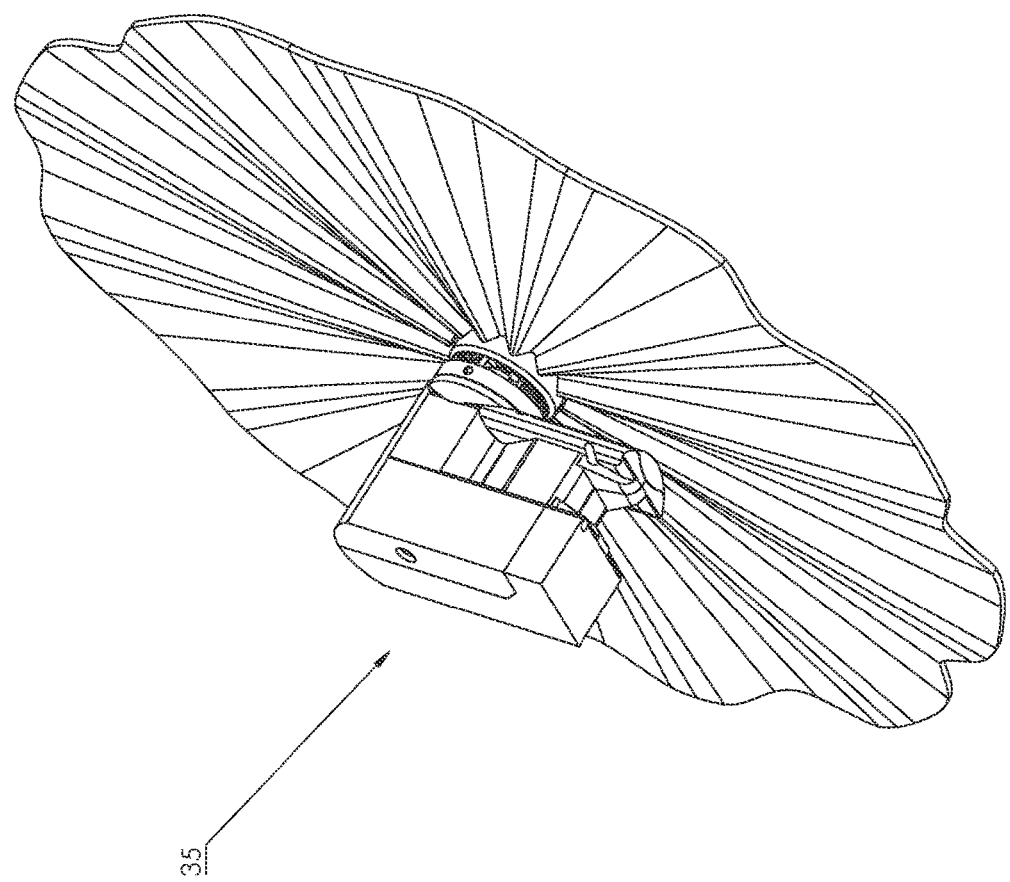
FIG. 4 illustrates a rotating scrubber tool according to the embodiment of FIG. 1.
Figure 5:
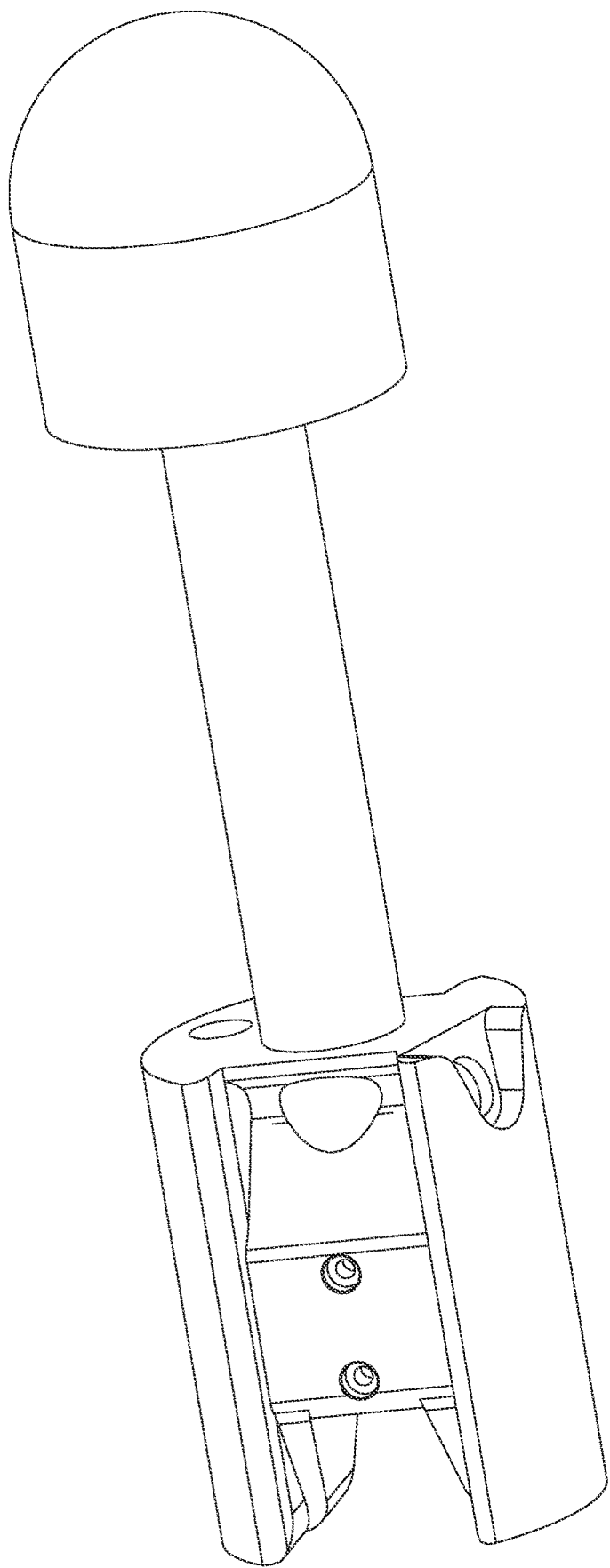
FIG. 5 illustrates a toilet brush cleaning tool according to the embodiment of FIG. 1.
Figure 6:
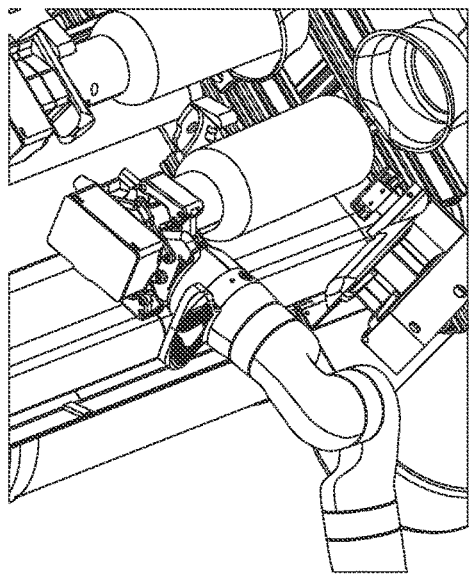
FIG. 6 illustrates a gripper performing a grasping action on a cleaning tool according to the embodiment of FIG. 1.
Figure 6:
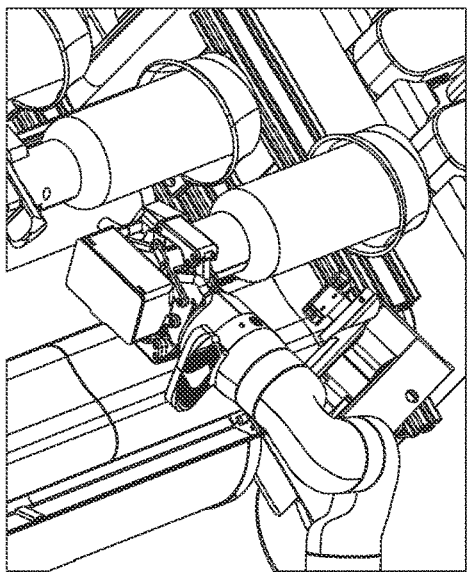
Figure 6:
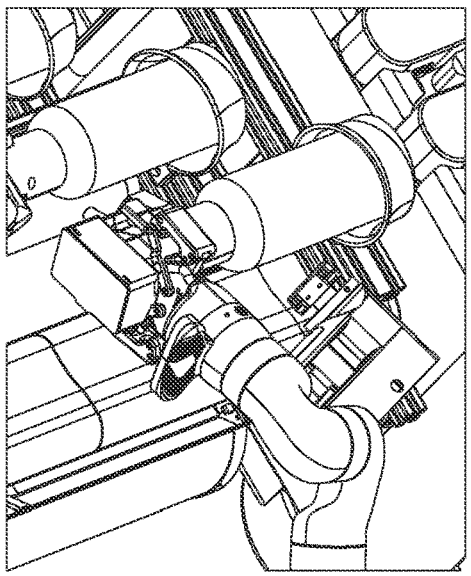

The base 28 and the conveyor 30 may further provide locations for storing tools to be used by the gripper. As depicted in FIG. 1, a modular carrier 34 may include locations to store a toilet seat lifter (see FIG. 2), a sprayer 38 (see FIG. 3), and a rotating scrubber 35 (see FIG. 4), and the base 28 may include a location to store a toilet brush (see FIG. 5). The rotating scrubber 35 may have a replaceable pad, which may be made of disposable or washable material in any one of multiple geometries, for example a single circular pad, a circular pad with slits cut into it, a set of strips attached to a central carrier or pad, or a combination of the aforementioned geometries. The replaceable pad may attach to the rotating scrubber any one of a number of ways, for example using Velcro, using a pincher attached to the rotating scrubber, or by the pad being attached to a carrier that mates with a mechanism that is part of the rotating scrubber. According to an embodiment, other tools may be provided, such as, for example, a vacuum, a broom, a sponge, a wedge, a rotating scrubber, a brush, an abrasive pad, a spray bottle, a paint brush, a caulk gun, a door stop, a door key or key card, a specialized sensor such as a bar code reader, a hook, a drill, a saw, a sander, a price tag printer, a price tag printer, and/or other tools that are needed for a specific task. As depicted at FIG. 6, the robotic arm 16 is configured to move to each location and use the fingers to grasp and remove each of the tools, depending on the task. According to an embodiment, the base 28 or conveyor 30, or other location on the cleaning robot 10, may include other types of attachments for one or a plurality of tools to be used by the gripper. For example, the modular carrier may be affixed to the base 28 or conveyor 30 for storing one or a plurality of tools to be used by the robot.

According to an embodiment, the modular carrier may be interchangeable with other modular carriers depending on the use of the cleaning robot 10. The modular carrier may include one or more tools, such as those described above, for an identified class of tasks. Such class of tasks may be, for example, cleaning a room, front desk management, restaurant cleaning, restaurant table service, and other tasks. For example, the modular carrier may be equipped with tools to clean a room, such tools explained in detail below. Alternatively, the modular carrier may be equipped with an encoder for room key cards, which may be used to encode and distribute a room key card to an individual requesting access to a particular room. The modular carrier may also be equipped with a dispenser for clean replaceable pads for attachment to the rotating scrubber, and/or a bin 39 for discarding dirty replaceable pads from the rotating scrubber.

Figure 8:
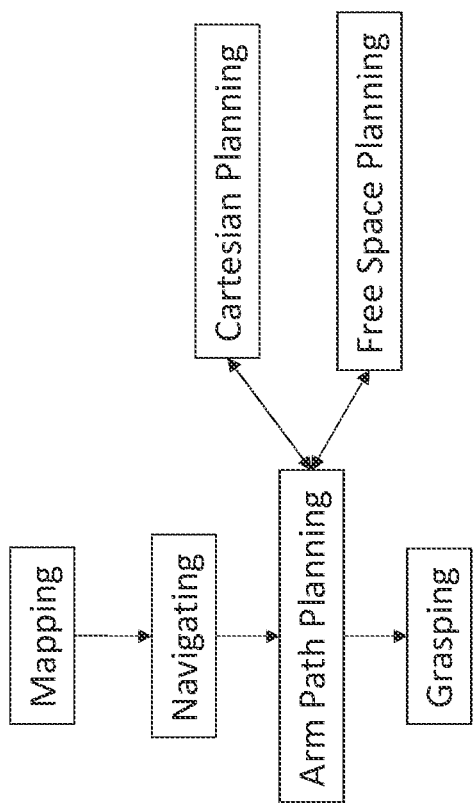
FIG. 8 illustrates a flow diagram of implementing aspects of an embodiment.

One or more of the transportation assembly 14, base 28, robotic arm 16, conveyor 30, and/or gripper 26, or other part of the robot may include an imaging system 40. For example, the imaging system may be attached to one or more of the robot frame 12, transportation assembly 14, robotic arm 16, gripper 26, and/or other part of the robot. According to an embodiment, the imaging system 40 may be provided apart from the robot. According to an embodiment, the imaging system 40 may comprise one or plurality of cameras which may be used by the robot in mapping, navigating, arm path planning, and grasping, as explained in further detail below and shown in FIG. 8. According to an embodiment, the one or a plurality of cameras may capture or process still images or video. According to an embodiment, the imaging system may comprise other sensors, as known to one of ordinary skill in the art, and as described below.

The transportation assembly 14 may comprise, for example, a set of wheels 32, e.g. standard wheels, omni wheels, and/or mecanum wheels, a crawler, or other transport systems which may be powered by the power system. The transportation assembly 14 may provide mobility of the robot.

Control System

Figure 7:
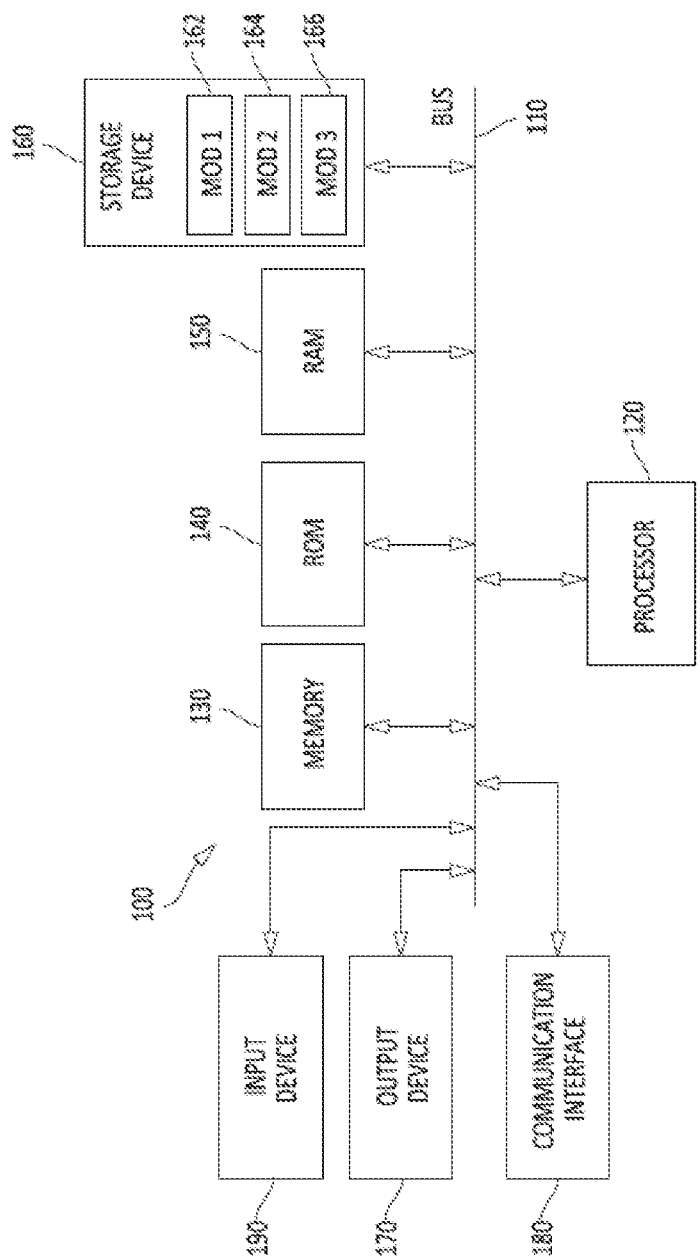
FIG. 7 illustrates an example computing device according to an embodiment of the current invention.

As explained above, the robot may include the computing device 100 to control and implement movement and navigation of the robot with the transportation assembly, robotic arm movement, gripper actuation, finger grasping, and other tasks. FIG. 7 is an example of a system that includes a general-purpose computing device 100, including a processing unit (CPU or processor) 120 and a system bus 110 that couples various system components including the system memory 130 such as read-only memory (ROM) 140 and random access memory (RAM) 150 to the processor 120. The system 100 can include a cache of high-speed memory connected directly with, in close proximity to, or integrated as part of the processor 120. The system 100 copies data from the memory 130 and/or the storage device 160 to the cache for quick access by the processor 120. In this way, the cache provides a performance boost that avoids processor 120 delays while waiting for data. These and other modules can control or be configured to control the processor 120 to perform various actions. Other system memory 130 may be available for use as well. The memory 130 can include multiple different types of memory with different performance characteristics. It can be appreciated that the disclosure may operate on a computing device 100 with more than one processor 120 or on a group or cluster computing devices networked together to provide greater processing capability. The processor 120 can include any general purpose processor and a hardware module or software module, such as module 1 162, module 2 164, and module 3 166 stored in storage device 160, configured to control the processor 120 as well as a special-purpose processor where software instructions are incorporated into the actual processor design. The processor 120 may essentially be a completely self-contained computing system, containing multiple cores or processors, a bus, memory controller, cache, etc. A multi-core processor may be symmetric or asymmetric.

The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices 160 such as a hard disk drive, a magnetic disk drive, an optical disk drive, tape drive or the like. The storage device 160 can include software modules 162, 164, 166 for controlling the processor 120. Other hardware or software modules are contemplated. The storage device 160 is connected to the system bus 110 by a drive interface. The drives and the associated computer-readable storage media provide nonvolatile storage of computer-readable instructions, data structures, program modules and other data for the computing device 100. In one aspect, a hardware module that performs a particular function includes the software component stored in a tangible computer-readable storage medium in connection with the necessary hardware components, such as the processor 120, bus 110, display 170, and so forth, to carry out the function. In another aspect, the system can use a processor and computer-readable storage medium to store instructions which, when executed by the processor, cause the processor to perform a method or other specific actions. The basic components and appropriate variations are contemplated depending on the type of device, such as whether the device 100 is a small, handheld computing device, a desktop computer, or a computer server.

Although the embodiment described herein employs the hard disk 160, other types of computer-readable media which can store data that are accessible by a computer, such as magnetic cassettes, flash memory cards, digital versatile disks, cartridges, random access memories (RAMs) 150, and read-only memory (ROM) 140, may also be used in the operating environment. Tangible computer-readable storage media, computer-readable storage devices, or computer-readable memory devices, expressly exclude media such as transitory waves, energy, carrier signals, electromagnetic waves, and signals per se.

To enable user or other interaction with the computing device 100, an input device 190 represents any number of input mechanisms, such as a microphone for speech, a touch-sensitive screen for gesture or graphical input, keyboard, mouse, motion input, speech, image recognition, and so forth. An output device 170 can also be one or more of a number of output mechanisms known to those of skill in the art. In some instances, multimodal systems enable a user to provide multiple types of input to communicate with the computing device 100, such as video and imagery. The communications interface 180 generally governs and manages the user input and system output. There is no restriction on operating on any particular hardware arrangement and therefore the basic features here may easily be substituted for improved hardware or firmware arrangements as they are developed.

In general, the computing device 100 may comprise one or a plurality of control systems to control the robot and/or aspects of the robot, as explained below. According to an embodiment, the computing device 100 may be localized on the robot 10 and may include one or a plurality of components distributed on the robot 10. According to another embodiment, the computing device 100 may be provided external to the robot 10 and may include one or a plurality of components. According to yet another embodiment, the computing device may be both localized on and provided external to the robot 10. The component or plurality of components may be a processor or a plurality of processors. According to an embodiment, the computing device 100 may comprise a plurality of networked processors on LAN, WAN, internet, or other communication protocol. Each processor may include one or more of the systems or subsystems in order to control one or more aspects of the robot. According to embodiments, the systems may be part of one system, a plurality of subsystems, or separate systems included with the robot. The systems or subsystems may be provided on the robot itself, or may be provided apart from the robot.

The control system of the robot may comprise a positioning control system 60 configured to communicate with said transportation assembly to provide commands to said transportation assembly such that said robot moves to at least one of a plurality of stations in a room or along a path in said room during said task. According to an embodiment, the positioning control system may be provided with a processor located at or integral with the transportation assembly.

The control system of the robot may comprise a robotic arm control system 70 configured to communicate with the robotic arm to provide commands to the robotic arm such that the robotic arm performs a series of operations to complete a task specific to one or more stations or along a path. The robotic arm control system may be further configured to communicate with the robotic arm to provide commands to the robotic arm such that the robotic arm grasps a tool to perform said series of operations to complete said task specific to the particular one or more stations or along the path. According to an embodiment, the robotic arm control system may be provided with a processor located at or integral with the robotic arm.

The control system of the robot may comprise a gripper control system 80 configured to communicate with said gripper to provide commands to said gripper such that said gripper performs a series of operations to grasp an object in accordance with a task. The gripper control system may be further configured to communicate with the gripper to provide commands to the gripper such that the gripper grasps a tool to perform said series of operations to complete said task specific to the particular one or more stations or along the path. According to an embodiment, the gripper control system may be provided with a processor located at or integral with the gripper.

The control system of the robot may comprise an imaging control system, such as an on-board computer configured to receive real-time image information of the environment of the robot from the imaging system and compare real-time image information with an image map providing a baseline of the room or area and structures to identify obstacles and clutter. The imaging control system may comprise a data storage device configured to store an image map of the room where the task is performed to provide a baseline of the room and structures in the room without temporary obstacles and clutter or any occupants in the room.

According to an embodiment, the on-board computer may communicate with the positioning control system and the robotic arm control system such that commands to the transportation assembly and commands to the robotic arm take into account obstacles and clutter identified by said on-board computer. The on-board computer communicates with the robotic arm control system such that commands to the robotic arm moves the clutter identified based on machine learning techniques in order to complete the task.

Power System

As explained above, the base may include a power system to power the wheels, electronics equipment, conveyor, arm, fingers, and other systems on the robot. According to an embodiment, the robot may swap out its own battery. According to an embodiment the robot may have a primary battery and one or more secondary batteries such that after removing a primary battery the robot can complete a swap of the primary battery using power from the one or more secondary batteries.

According to an embodiment, the robot may dock with a power source so that during a swap out operation the robot is powered by energy from the dock. For example, the base of the robot may include a power input that connects to an electrical outlet. According to an embodiment, the robot may plug itself into a standard electrical outlet.

According to an embodiment, the robot may receive its power from another robot.

According to an embodiment, the robot may swap the battery of a second robot for a freshly charged battery According to an embodiment, the robot may receive power from an alternative power source such as wireless power, solar power, a supercapacitor, or any other power source not previously described.

General Technique for Performing a Task

According to an embodiment, a set of motions for an arm and/or hand are recorded. In this context a robot hand or gripper may be a physical interface to other objects in the real world, including objects that are meant to be grasped, as well as to tools, such as scrub brushes and cleaning tools. According to an embodiment, the robot hand may hold a gripper that itself is used as a physical interface to other objects, such as objects in the world that are meant to be grasped or to tools. The set of motions may be recorded using zero, one, or more of the following techniques:

A. Physically moving the arm and/or hand through a set of motions and recording joint angles and/or arm segment positions. In one embodiment, just the position of the final segment is recorded.

B. Moving the arm and/or hand through a set of motions in simulation and recording joint angles and/or arm segment positions. In one embodiment just the position of the final segment is recorded.

C. Determining a set of motions for the arm and/or hand by using mathematics to determine the path of the final segment of the arm and/or hand such that it follows the contours of an object to be acted on, e.g. wiping a sink or painting a wall, and using mathematics to determine joint angles necessary to achieve said path. Cartesian Motion Planning may be used, which follows the contours of an object with a robotic arm such that an entire surface is passed over.

According to an embodiment, the set of motions of the arm and/or hand or gripper are executed when the robot is asked to do work, e.g. cleaning a sink or other object.

According to an embodiment, the set of motions of the arm and/or hand or gripper are adjusted when the robot is asked to do work, e.g. cleaning a sink or other object. These adjustments may include zero, one, or more of the following:

A. Adjustment for the position of the robot. For example, if the path was recorded when the robot was 25 cm in front of and 10 cm to the right of a sink, the paths may be adjusted for the robot being 24 cm in front and 8 cm to the right of the sink such that the motion remains the same relative to the sink.

B. Adjustment for force of wiping. According to an embodiment, a sensor or set of sensors may be included with the robot that can measure force, such as force normal to a surface being cleaned. According to an embodiment, force may be measured through force through each joint in a robotic arm, and/or gripper, and/or wrist, and/or hand, and or fingers, and the forces are mathematically computed for the desired force, such as a force normal to cleaning contact. According to an embodiment, the force of contact, such as the normal force, is measured directly through one or more sensors. According to an embodiment force is measured through feedback from a tool held by the robot, e.g. by measuring motor current used by a rotating wiping tool to maintain its rotation speed, which acts as a proxy for force since requiring less or more current for the motor to maintain its rotation speed implies that less or more cleaning force is currently being applied. A control system may be included that adjusts the set of motions of the robot arm and/or hand so that a particular force is maintained, such as force normal to the contact direction of a cleaning tool.

C. Adjustment for changed situation. According to an embodiment, a recorded path may be changed based on a changed circumstance, such as an unexpected obstacle.

Typical robotic arms cannot smoothly move their distal joints through an arbitrary series of positions and orientations. For some series of positions and orientations a singularity exists at some point in the series such that the arm must make a discontinuous motion to continue the series. It is likely that for a given recorded set of motions of the arm and/or the hand that an adjustment of too large a magnitude would make continuous motion through the set of motions impossible and a discontinuous motion would be required. According to an embodiment, the recorded set of motions of the arm and/or the hand are chosen so that no discontinuous motion is required when adjustments are made through the full expected range of magnitude of possible adjustments, e.g. if the maximum adjustment is 4 cm in any direction, 4 cm adjustment does not result in a need for discontinuous motion anywhere along the recorded set of motions. In an embodiment, during or after recording a path a mathematical function is performed to assist in recording a path that meets this criteria, and/or flags a path that does not meet this criteria and therefore needs to be adjusted and re-recorded.

According to an embodiment, the set of motions of the robot arm and/or gripper is recorded such that the motions grasp a tool such as a scrub brush. Actions related to a tool may include zero, one, or more of the following:

A. Grasping a tool;

B. Removing a grasped tool from a storage position such as a magnetic tool holder on the body of the robot;

C. Returning a grasped too to a storage position such as a magnetic tool holder on the body of the robot;

D. Ungrasping a tool.

According to an embodiment, the motion of the robot arm and/or gripper are recorded with a tool in the gripper. All the aforementioned statements related to the robot arm and/or gripper may apply to a robot arm and/or gripper with a tool in the gripper.

According to an embodiment, the tool will have a force sensor built in which measures force, such as force normal to a cleaning contact position. The force sensor may communicate with the computing system 100 or control system through zero, one, or more of the following techniques:

A. Wirelessly through a communication protocol known to those familiar with the art.

B. Through wires that are contacted by contact from the robot hand to the tool.

C. Visually through a force readout, e.g. a mechanical dial or other indicator or e.g. through an electronic interface such as a group of LEDs that each represent a different force. Such visual interface may be read by a camera e.g. on the body of the robot.

D. Through other communications means such as an optical communication mechanism, sound waves, etc.

According to an embodiment, a tool may have its own motion, such as vibration, linear back and forth motion, or rotation. Power for the motor for these motions may be provided by on-board rechargeable batteries, a power contact that is physically contacted through the gripper, a wireless power system, or other means of power known to those knowledgeable in the art.

According to an embodiment, a tool may include a reservoir of fluid necessary to perform its task, such as a reservoir of cleaning fluid for a cleaning tool or a reservoir of paint for a painting tool. Such a tool may include a mechanism for dispersing the fluid onto the active portion of a tool, for example a pump to distribute cleaning fluid into a sponge. Passive distribution of fluid may be used, such as a sponge that contacts cleaning fluid, and capillary action carries the cleaning fluid into the portion of the sponge that contacts a surface to be cleaned.

According to an embodiment, the motion of the robot arm and/or gripper may be adjusted to allow a tool's motion to have maximum efficacy. According to an embodiment, force normal to e.g. cleaning contact may be adjusted using a control system for maximum force that still enables motion of the tool. For example, force may be adjusted so that a tool that has linear back and forth motion has the maximum force normal to an e.g. cleaning contact area consistent with the back and forth motion achieving a particular target minimum speed, such as one stroke per second.

According to an embodiment, the motion of the robot arm and/or gripper may be adjusted to compensate for the direction of motion. For a tool with linear back and forth motion, the position of the end of the robot arm and/or gripper may be adjusted to compensate for the direction of force due to the direction of motion, such as inward or outward at a particular moment. For example, using a coordinate system, if the recorded position of the end of the arm is (17, 3, 43), the target position may be adjusted to (17, 3, 44) during the outward stroke and (17, 3, 42) during the inward stroke. Such adjustment may be designed to provide a consistent end position, as play and/or springiness in the robot arm, hand, and/or tool joints and/or segments result in alternating directions of inaccuracy of the final position.

For a tool with spinning motion, a similar adjustment might be made relative to the direction, speed and/or force of spin where direction of spin relative to the contact point determines the direction of adjustment while speed and/or force of spin determine the magnitude of adjustment. The adjustment amount may be determined empirically and/or heuristically and implemented as a table or an equation that captures an approximate adjustment, through a mathematical model and/or through machine learning, such as through a supervised learning technique with a dataset created from real-world data and/or using simulation.

According to an embodiment, different paths may be recorded for performing a task on the same object. For example a path may be recorded for cleaning a portion of a sink that is already clean while a second path may be recorded for cleaning a portion of the sink where a surface anomaly has been detected, such as a sink having toothpaste dried thereon.

Many such paths may be recorded, such as, for example when the task is cleaning:

A. For areas with no visible dirt;
B. For areas with little visible dirt;
C. For areas with streaks;
D. For areas with dried on dirt that requires heavy scrubbing;
E. For areas that have hairs that need to be removed;
F. For areas that are wet that need to be dried;
H. For areas that require special procedures, such as a stopped up toilet or a gooey pile of spilled hair conditioner.

According to an embodiment, the robot may be able to clean surfaces. In a preferred embodiment the surfaces may be those in a commercial office or in a hotel, e.g. the surfaces that comprise the inside and outside of a toilet, sink, shower, tub, desk, etc.

According to an embodiment, the end of a robot arm may be programmed to traverse a predetermined path, e.g. the path of the arm may be preprogrammed to go from coordinate (7, 72, 6) to coordinate (7, 72, 12) followed by traversing from (7, 72, 12) to (7, 74, 12).

According to an embodiment, the aforementioned coordinate system may be defined to be relative to a feature in the world, for example a bar code style tag, such as an AR Tag. So for example coordinate (7, 72, 6) may represent the position 7 cm above a particular AR Tag, 72 cm to the right and 6 cm ahead.

According to an embodiment, the coordinate system may be that in a pre-stored map, for example the coordinate (7, 72, 6) may represent the position 7 cm above the floor, 72 cm to the right of the left wall, and 6 cm ahead of the back wall.

According to an embodiment, Bayesian techniques such as a particle filter or kalman filter may be used to determine the pose of the robot in the world so that the location of coordinates in the pre-stored map may be able to be translated into those coordinates relative to the current position and orientation of the robot.

For some combinations of robot arm geometry, path definition, and robot pose the entire path may not be able to be completed in a continuous motion, or may not be able to be completed at all.

According to an embodiment, an analysis step may be performed before or during the following of the path to adjust the pose of the robot and/or adjust the position of joints that have multiple possible positions such that a parameter is optimized, for example such that minimum time is required or such that a wet sponge remains over the sink.

According to an embodiment, a region is marked on a map and a path is calculated on the fly to cover this particular region given the current robot pose.

According to an embodiment, a combination of preprogrammed paths and on-the-fly region based paths may be used. According to an embodiment, a three-dimensional map of a space may be created. According to an embodiment, the three-dimensional map may be annotated with one or more of the following:

a. Segmentation information (i.e. which parts of the map represent different objects or portions of an object);
b. Surface material;
c. Color and/or texture;
d. Task to be performed;

e. Tool to use;
f. Protocol to use (e.g. for cleaning, scrubbing speed, cleaning fluid, wetness, rinse protocol, etc.);
g. Frequency needed for performing the task;
h. Inspection protocol.

Mapping & Navigation

A map of an area to where a task is to be performed may be provided to the computing system of the robot to be stored in its memory. According to an embodiment, the robot may move through an area, such as a series of rooms of a building, and use the camera to create a three-dimensional map of the area and objects in the area with the computing device. For example, the three-dimensional map may include three-dimensional images of items placed in a desired location in the area. For example, the three-dimensional map of a bathroom may include a soap dispenser placed on a countertop near a sink.

According to an embodiment, the map may be created using Simultaneous Localization and Mapping (SLAM). As known to those in the art, SLAM uses statistical or Bayesian techniques to simultaneously create and traverse a map. These techniques may include particle filters, kalman filters, or optimization based techniques. As is known to those familiar with the art, the position and orientation of a robot or other item may be determined with sensors using these same techniques or other techniques such as using gradient descent to find likely candidates for current position based on current sensor readings.

According to an embodiment, the robot may be moved to a position that is as close as possible to the position that motion was recorded for the set of motions of the robot arm and/or hand, so that this set of motions are valid and correct.

According to an embodiment, a series of positions may be recorded, each with an associated set of motions of the robot arm and/or hand. For example, the robot may be positioned for a set of motions of the robot arm and/or gripper that cleans a sink, and then the robot may be repositioned for a set of motions of the robot arm and/or gripper that cleans part of a toilet and then yet another position for a set of motions of the robot arm and/or griper that cleans the remainder of the toilet.

According to an embodiment, the robot may navigate through doors by marking the door in the map as a movable object. According to an embodiment, the door may be opened using zero, one, or more of the following techniques:

A. The door opens itself through its own sensor that tells it to open. The sensor for example could be a proximity sensor that detects presence of the robot through weight, presence in a particular space, by breaking a beam of light or disturbing and ultrasonic field, or through presence of an RFID. In some embodiments the robot is utilizing existing sensors that allow a door to autonomously open for people, such as an ultrasonic door opening sensor.

B. The robot actuates the door physically by for example pulling it open or turning a door knob and pulling or pushing.

C. The robot actuates the door electrically through a switch, for example by pressing the switch that is intended for people with disabilities to operate the door.

D. The robot actuates the door through an API, for example communicating through Wifi to a door controller.

According to an embodiment, the robot may enter and/or exit an elevator. The elevator may be actuated by zero, one, or more of the following techniques:

A. By pressing the up or down button in the elevator lobby and then pressing a floor button in the elevator.

B. By communicating with the elevator controller, using an API to make a request for the elevator to perform whatever action is desired.

According to an embodiment, the robot may interact with people and/or other dynamic obstacles. Interactions may include, for example:

A. Stopping when there are people and/or other dynamic obstacles. The robot may follow a motion plan as needed to perform its task and/or reach a position for its next task but stops if people and/or other dynamic obstacles are in its path. The robot may remain stopped until the people and/or other dynamic obstacle moves.

B. Teleoperation. According to an embodiment, the robot may request a teleoperator to control the robot when its motion plan is blocked by people and/or other dynamic obstacles.

C. Replanning. According to an embodiment, the robot may create a new path plan based on dynamic obstacles.

D. Combination of A, B, and C. According to an embodiment, the robot may first attempt to perform (C) Replanning. In this embodiment if the replanning is not successful the robot stops as per (A). A request to the teleoperator (B) may be made for manual resolution to the blocked path.

According to an embodiment, each floor of a space is mapped. When the robot uses the elevator or other means to move between floors the map for that floor may be used.

According to an embodiment, a set of maps may be created such that the number of maps are less than the number of floors. Maps are associated with given floors. For example in this embodiment floor 1 might be associated with map A and floors 2 through 8 associated with map B, while floor 9 is associated with map C. This may be useful for hotels and other buildings with some floors that are identical, for example those in a hotel that contain guest rooms.

Classification

According to an embodiment, objects are classified. They may be classified using zero, one, or more of the following techniques:

A. Using machine learning based on a supervised learning dataset or other machine learning techniques known to those skilled in the art.

B. Through tagging, wherein the objects contain a direct indication of what they are, such as an RFID, a bar code, an AR Tag, or other means known to those skilled in the art.

C. Through position in a map, e.g. a sink may be tagged in a map of a room, and the object in that position is assumed to be a sink.

D. Through mapping difference and position. For example a bathroom may be mapped with the floor clear of extraneous objects. If sensors detect occupancy in a space that was free space when the space was mapped an object is assumed to be present. In some embodiments the identity of the object is determined by its position. For example an object on a bathroom floor may be classified as a dirty towel simply because it is in that position.

According to an embodiment, an action performed may be based on the classification of the object. For example a dirty towel when classified may be placed into a hamper. According to an embodiment, a list of such actions may be created and/or acted on. Such actions may include zero, one, or more of the following:

A. Placing dirty towels into a hamper.
B. Placing trash into a trashcan.
C. Emptying a trashcan.
D. Moving an amenity, such as a soap, shampoo, or conditioner from a first position to a second position.
E. Setting the time on a clock that has the wrong time.

F. Turning off the alarm of a clock that is set with the alarm on.

According to an embodiment, the lack of an object may prompt an action. According to an embodiment, a list of such actions is created and/or acted on. Such actions may include zero or more of the following:

A. Placing clean towels onto an empty towel bar.

B. Placing soap, shampoo, coffee, or other toiletries or consumables onto a shelf, desk and/or countertop.

C. Placing items in a supply closet or on a store shelf when less than the minimum stock level is detected.

Arm Path Planning

A planned path for the arm may require movement of the arm beyond its range. According to an embodiment, if the arm is mounted on a mobile base, the arm controller may send a command to the mobile base to move in a specified sequence of actions such that the actions of the mobile base combined with the arm motion achieves the desired motion. According to another embodiment, a motion controller may treat the mobile base and arm together as a single system for motion planning.

According to an embodiment, the arm path planning may comprise finding a sequence of knots for the arm to pass through. A knot is a specified location for the arm and can either be specified as the joint positions of the robot or the position and orientation of the end effector or position. The sequence of knots are planned using a planner, where an objective can be specified. According to an embodiment, the objective can take the form of a cost function, with a series of quantified possible goals. Example goals may include, but are not limited to: Normed distance in configuration space, distance in task space, avoiding a singular configuration of the robot, avoiding obstacles, maintaining a predetermined distance from certain objects such as humans.

According to an embodiment, the arm path planning may identify the shortest path for the arm to take to move from a first position to a position to begin or complete a task. For example, identifying the shortest path may comprise using a rapidly expanding random Trees or RRT or a variant thereof; optimization based methods which include mixed integer programming, sequential quadratic programming, quadratic programming and linear programming; creating a grid of the configuration space or task space of the robot and using graph search algorithms such as A*, D*, Theta*, D* lite etc. According to an embodiment, the methods are also not exclusive to each other. For example, the result of an RRT may be used as an initial guess or warm start to a sequential quadratic program. As another example, sequential quadratic programming may be used to solve for local plans while the RRT may be used to solve for a global plan.

A singular configuration may be identified by taking the ratio of the smallest and largest singular values of the arm's Jacobian value.

Gripping and Grasping

According to an embodiment, an object may be moved out of the way before another action is performed. According to an embodiment, the object may be later returned to its original position. According to an embodiment, an object (such as a soap dispenser) may be removed from an area that requires an operation to be performed (such as a countertop that is to be cleaned), the operation may be performed, and the object may be returned to the area.

According to an embodiment, a robot in the real world may be trained to grasp, grip, push, or otherwise manipulate objects by training a neural network in a simulated environment which is then used by the robot to perform similar functions in the real world. The simulated environment may contain one or more robotic components that are designed to do such actions, e.g. a robotic arm with a gripper along with one or more simulated objects to perform the action on. The simulation may include a physics engine which is used to assess whether the action was successful.

According to an embodiment, a series of grasps based on heuristics may be attempted in simulation, each attempt annotated with a measure of how successful the attempt was (for example an attempt could be annotated as success or failure, or in another embodiment be annotated as successful, partially successful, or failure). The aggregation of the data from these attempts may form a dataset that may be used for machine learning using techniques known to those skilled in the art. According to an embodiment, supervised learning may be used.

According to an embodiment, the dataset may be appended with data from attempts in the real-world. According to an embodiment, these pieces of data may be weighted as extra important e.g. by including them multiple times in a dataset where simulated data is only included single time per attempt.

In the synthesized world, the objects to be manipulated may be generated a number of ways including zero or more of the following:

a. Data from public datasets, such as household objects;

b. Data from the real-world, such as data extracted from RGB and/or depth images, and c. Artificial shapes that are generated programmatically.

Objects to be manipulated may be generated programmatically, such as, for example, by the following:

a. The objects may be programmatically designed to be difficult to grasp. These are known in the industry as Adversarial Objects.

b. The objects may be designed to be variations of real objects, for example a set of real objects in different sizes or stretched or shrunk in one or another dimension.

c. The objects may be designed to test limits of capability, for example by being long or flat or being top-heavy.

d. The objects may be variations of soft or articulated objects, for example different instantiations of towels on a floor or different instantiations of eyeglasses.

According to an embodiment, a large number of random objects may be created and evaluated as to suitability to the desired criteria, with those not meeting the criteria discarded.

According to an embodiment, the objects may be created directly, for example, by taking a library of real world objects and stretching, shrinking and/or deforming them.

According to an embodiment, multiple objects may be placed within a scene for attempted grasps. For example, methods of placing objects within the scene may comprise:

a. The objects may be simulated as being dropped from a random height onto a synthesized surface, and they remain where they land after settling time.

b. The objects may be explicitly stacked, e.g. by placing the next objects center of gravity on the largest flat surface available.

c. The objects may be stacked heuristically as a human would. For example a bath mat is dropped followed by a wet towel is dropped followed by a wet washcloth followed by a bathrobe.

According to an embodiment, the simulation may include one or more virtual imaging devices, e.g. cameras. These imaging devices may provide one or more of monochrome images, color images, infrared images, hyperspectral images, depth images, and/or other types of images. These imaging devices may be designed to mimic the performance of real physical imaging devices in the real world.

According to an embodiment, the simulation may include a virtual imaging device mounted to the robotic arm, e.g. the robot's wrist.

According to an embodiment, the simulation may include a virtual imaging device in a fixed position, for example:
  a. Overhead;
  b. Horizontally facing the work;
  c. Any other position in which the work of the arm partially or fully appears.

According to an embodiment, multiple virtual imaging devices may be included in the simulation.

According to an embodiment, the learning data set may include the images from these one or more virtual imaging devices.

According to an embodiment, supervised learning may be performed based on the aforementioned data set using techniques known to those in the art.

According to an embodiment, reinforcement learning may be performed based on the aforementioned data.

According to an embodiment another learning technique may be used, as is known to those skilled in the art.

According to an embodiment, a closed loop grasping technique may be used wherein the grasp and/or manipulation may be recalculated dynamically as the arm is moving.

Closed loop grasping may comprise the following steps:
1. Determining an initial grasp;
2. Adjusting the grasp dynamically while motion is executing to adjust for motion of the object to be grasped, motion of the base of the robotic arm, or for any other inaccuracy of the system.

Dynamic grasp adjustment may comprise zero, one, or more of the following techniques:

A. Recalculating the grasp dynamically as the robotic arm is moved using whatever means was used to calculate the grasp initially. If a neural network is used for calculating the grasp, it may be important to have a small enough neural network so that adjustments to the grasp may be calculated in time for the arm to make the physical adjustments necessary. This may comprise some combination of the neural network being relatively small and/or the arm moving relatively slowly.

B. Using visual servoing wherein a control loop is implemented based on the visual relationship between the grasper and the object to be grasped. For example, the steps may be as follows:
  i. Begin to reach for an object to be gripped using a calculated path.
  ii. Aim a fused set of sensors (sensors could include cameras and/or point cloud depth sensors) on the object to be gripped.
  iii. When the robot gripper enters the visual frame of the fused set of sensors begin tracking of reference points on the robot gripper using tracking techniques known to those skilled in the art.
  iv. Implement a control system using techniques known to those skilled in the art of robot control to move the robot gripper through the path that is the precalculated path relative to the gripper reference points following the desired path relative to the object to be grasped. This is in contrast to motion that is an absolute path without regard for the actual position of the object and the gripper. Visual servoing corrects for changes in position of these objects and for inaccuracy in measurement and/or motion.

According to an embodiment, during gripping, the accuracy of motion of the base and/or the wobbling or other motion of the base of the arm may result in an inaccurate path for the end of the arm. To mitigate this according to an embodiment, the closed loop grasping technique may be used.

One special class of object in the world is the articulated object. These objects consist of two or more segments attached together with hinges. Examples of articulated objects include:
  a. Doors (door is articulated relative to door jamb);
  b. Some paper towel dispensers (dispenser cover is articulated relative to the portion mounted to the wall).
  c. Toilet seat Most articulated objects share the characteristic that manipulating the object involves moving the distal end through an arc. Other objects, while not articulated, also share this characteristic that they are actuated or manipulated by being moved through an arc. Examples include a toilet flush handle and a level style door handle.

According to an embodiment, the robot may be taught how to actuate such objects by moving the robot arm through the arc. During the motion the computing system or software module may register a radius of the arc as well as angular limits of motion relative to the pose of the object. When the robot software wishes to interact with the same object in the future the following steps may be performed:
  a. Classification of the object may be performed to detect which object this is;
  b. Pose of the object may be detected;
  c. Arc of motion and angular limits associated with this object type may be retrieved from a database;
  d. The arc of motion may be corrected as needed for the actual pose of the object.
  e. An initial grasp may be chosen (this is described below);
  f. The robot may perform the initial grasp followed by the portion of the arc needed to implement the desired function.

To move the distal portion of an object, an initial grasp must be chosen. In some situations a single grasp for the entire arc may be effective, however in some situations the grasp may need to be changed for different points within the arc. A good example of this is raising and lowering a toilet seat, where moving the toilet seat when in the fully open position requires a grasp that applies force to move the top of the seat, whereas when close to closed requires a grasp that applies force to the bottom of the seat in order to slow down the motion of the seat to keep it from slamming shut.

According to an embodiment, the grip needed for different points on the arc may be explicitly demonstrated or programmed by a person.

According to an embodiment, the grip may be dynamically changed during motion through the arc by applying linear interpolation of the values for the grip finger positions.

According to an embodiment, grip may be dynamically changed during motion through the arc by simulating changes in grip to form a supervised learning data set or for reinforcement learning. The robot may learn where to shift grip through such learning.

According to an embodiment, the robot may clean its fingers. This may be performed as follows:
  a. The robot may carry a special device to clean its fingers that may include a cleaning fluid that may optionally be recirculating;
  b. The fingers may be enclosed in a removable sheath, i.e. a glove.

Classification of Anomalies by Classification of Surface

According to an embodiment, a cleaning region may be identified for cleaning and/or for extra passes of cleaning according to if dirt is detected in that region.

According to an embodiment, regions of dirt may be detected using machine learning based on either classifying images that are of clean areas versus dirty areas or objects or by using machine learning of force feedback, e.g. the machine learning the distinctive force profile of wiping a surface that is sticky or has gritty dirt. Some embodiments may comprise a combination of image and force profile data either using separate networks or by feeding both types of data into the same network.

According to an embodiment, machine learning may be performed using images of clean and dirty examples of particular materials, for example clean and dirty white porcelain.

According to an embodiment, the classifier for clean versus dirty is chosen according to which material the annotated 3D map indicates is at a particular area. For example an area that the 3D map indicates is white porcelain may use a classifier that was trained on clean and dirty white porcelain whereas a region of the 3D map that indicates there is chrome may use a classifier that was trained on clean and dirty chrome.

Learning Types of Grasps

Human hands have a number of modes of gripping, such as squeezing, wrapping, palming, as well as modes that are made up on the spot for a particular item or task.

In contrast, in research robots the most common robotic gripper is a two-fingered hand, which grasps items by squeezing between the two fingers. Software researchers have generally been working at more and more capable software packages for utilizing this very simple gripper.

Mechanical robotics engineers and researchers have put much effort into building robot manipulators that are more mechanically capable, utilizing e.g. electrostatic or vacuum-lockable granules to grasp objects with little intelligent software.

Other researchers have worked with close analogs to the human hand, utilizing machine learning techniques to learn how to manipulate objects, such as moving a wooden block to a desired orientation.

While advanced software with artificial human hands in theory would have the full capabilities of humans, in practice this approach is limited because control and actuation of a human-like hand that is equal in strength to a human hand requires a much larger physical space than a human forearm, making the overall solution unwieldy. In addition, control of a human-like hand for grasping with the flexibility of grasp choice of a human hand is an unsolved problem in AI. Also, this solution is mechanically complicated, so it would be expensive and prone to breakage.

A better solution is a hand that has many of the modes of operation of the human hand but with fewer actively controlled joints. In robotics each actively controlled joint is called a degree of freedom. In a preferred embodiment the number of degrees of freedom is 2 or 3.

According to an embodiment, a robotic hand may be constructed in the simulation with an identical robotic hand in the real world.

According to an embodiment, grasping trials may be performed in simulation for each of the distinct gripping modes of the robotic hand, forming a dataset for supervised learning or for use with reinforcement or other types of learning as previously described.

According to an embodiment, grasping trials may be performed in simulation for blends of the gripping modes through one or more of the following techniques:

a. Applying a random scaling factor to the motion of one or more of the degrees of freedom during simulated grasping. For example if a grasp would normally move each of two degrees of freedom equally, a random factor of 92% speed could be applied to the first degree of freedom.

b. Choosing random rates of motion of each degree of freedom;

c. Moving the joints associated with certain degrees of freedoms as is normal for the grip, while moving the remainder randomly.

According to an embodiment, dimensions of the gripper may be created from parameterized values.

According to an embodiment, grips may be attempted while varying the parameterized gripper dimension values randomly. The success of grips for different gripper dimension values may be compiled, with the most successful lengths being used for the real gripper. These trials may be performed on objects that are specific to a particular application so that the gripper used for a particular application is optimized to gripping the types of items most important to the application.

According to an embodiment, a robotic hand holds a tool, for example a scoop for granular solids such as cat litter.

In such embodiments the tool may be grasped using techniques described elsewhere in this patent. According to an embodiment, the tool may be stored in a known position, for example in a modular carrier. The tool may be grasped or removed by following a predetermined sequence based on the known position.

According to an embodiment, the tool may have a fiducial that enables exact knowledge of the position and orientation of the tool. This information is may be used to adjust a predetermined path to be correct for this pose.

According to an embodiment, the tool may act upon materials or objects in the world, for example a scoop acting on a granular material, for example getting granular material into the scoop. For said embodiments, the simulation may include the tool and simulate the desired action, creating data for supervised learning or for reinforcement learning or for other types of learning known to those skilled in the art.

In such an embodiment the simulation may include the tool and the materials or objects in the world. In the simulation random or heuristically generated trials of the action may be performed. Each trial may be recorded as a data group that includes the visual and/or depth image of the materials to be acted on along with a tuple of the parameters (such as tool path) that were used for execution of the trial along with an indication of how successful the trial was. In a preferred embodiment the indication of success may be binary, e.g. successful or unsuccessful. These data groups may be used as a dataset for supervised learning of a neural network that learns which parameters to use for a given visual and/or depth image.

According to an embodiment, the tool may act upon a surface, for example a paint brush or roller, a sponge, or a cleaning brush. According to an embodiment, the desired action may be acting against a surface with a particular pressure. In such embodiments a classical control system may be utilized for controlling position in the direction normal to the surface of interest while a separate system may move the tool in the plane of the surface, e.g. with a scrubbing motion.

Robot Applications

In some embodiments the robot has one or more imaging sensors, such as a camera, a LIDAR, a structured light sensor, and/or a near-infrared camera.

In some embodiments the robot uses its one or more imaging sensors to take photos of the space the robot is in, static objects, people, pets, or other dynamic objects that are in proximity to the robot. According to an embodiment, taking a photograph may be triggered by zero, one, or more of the following:

A. A request through a user interface, such as a voice interface or a mobile app. For example a person could verbally say "Robot, take a picture of me and my wife" and the robot may take a picture in the direction of the requestor.

B. A first robot may use an API to have a second robot take a photograph of the first robot and things in proximity to the first robot. The first robot may activate the API based on zero or more of the following:
  i. A request through a user interface, such as a voice interface or a mobile app. For example a person could verbally say "Robot, I'd like to get a picture with you" and this first robot may utilize the API to summon the second robot.
  ii. In response to a physical action. For example the first robot may be programmed that when a person puts their arm around the first robot to use voice synthesis to say "let's get a photo of this" and then use the API to summon the second robot which may take the photo.

C. A change in motion of a tracked object. In these embodiments a particular object such as a particular child is tracked using techniques known to those skilled in the art. A rapid change in velocity or direction may trigger a photograph to be taken.

D. Proximity of a tracked object to a fixed map position. A photograph may be taken whenever the tracked object, such as a particular child, crosses into a particular region on a map of the environment, for example when entering the swimming pool, or when walking into a particular doorway of a particular restaurant.

E. Proximity of a first tracked object to a second tracked object. A photograph may be taken whenever the tracked object, such as a particular child, moves within a certain distance of a second tracked object, such as a costumed character.

F. Based on a neural-net based classifier. In this case sets of photographs are made available to a person who may be interested in the photos, for example photos of a child are made available to one or both of the parents. A dataset may be created based on which photographs are determined to be the best, for example based on those that are selected for high-resolution download or based on which photos are marked as 'favorites'. In a preferred embodiment the dataset may be an aggregation of the decision of the best photographs from a large number of different users. This dataset may be used to train a neural network as to whether a photo would be perceived as worthwhile. In this embodiment the neural network may monitor an imaging device and may keep a running estimate of the likely perceived value of a photograph at each moment based on the output of the neural network. In this embodiment photos may be taken (i.e. stored and forwarded) whenever the output of the neural network indicates that the photograph has passed a threshold where it is likely to be considered a worthwhile photo.

G. Based on a time or an event. In this embodiment a photograph may be taken whenever a certain action occurs or time occurs. For example photographs of a hotel room may be taken when cleaning is completed. In a preferred embodiment such a photograph may be further analyzed using a neural net to verify quality of cleaning. In some embodiments the quality of human work as well as robots' work may be analyzed using such a neural net.

In some embodiments photos are forwarded to a person who is deemed likely to be interested in the photos. According to an embodiment, providing these photos may include:

A. Emailing the photos;
B. Providing the photos via social media;
C. Physically printing the photos;
D. Displaying the photos on a display.

In some embodiments a person likely to be interested in a set of photos is identified. According to an embodiment, identification may include:

A. Direct identification through a user interface at the time photos are taken, such as a voice interface where email address is requested and provided.

B. Interface through a mobile app, wherein a communications channel e.g. bluetooth is used between an app running on a smartphone and the robot to transfer contact information such as email address. In a preferred embodiment the mobile app would be the mobile app associated with the company, organization, and/or property where the robot is located. For example if the robot is located at a hotel the mobile app could be the one associated with that hotel company.

In some embodiments the robot may be addressed verbally. In some embodiments the robot may respond to any of the following:

A. Generic verbal commands that do not specify that a robot is to perform the task, such as "bring me that towel". Such a command may be performed by the nearest robot, however the robot may not respond if a human is acting to complete the task. In some embodiments an arbitrage function may be performed such that the task is assigned to a particular robot.

B. Commands that specify that any robot is to perform the task, such as "Robot, bring me the towel". These commands may be executed in a manner similar to generic commands except a response would occur whether or not a human is also responding to the command.

C. Commands that specify that a Peanut robot is to perform a task, such as "Peanut, bring me the towel". These commands may be executed in a manner similar to generic commands.

D. Commands that specify that a particular robot is to perform a task. In some embodiments each robot has a serial number such as "1357" and/or a name such as "Dustin" or "Dustin13". In some embodiments robots respond to their name and/or serial number such as "Dustin, bring me the towel". In some embodiments the same name may be used on multiple robots as long as they are not in physical proximity to each other. For example there may be 2 robots named Dustin, one located in Detroit and another in Boston.

In some embodiments the robot may include one or more displays. The one or more displays may include the following types:

A. Video screen attached to the robot
B. A display that appears on the body of the robot, e.g. using a rear projector onto the surface of the belly of the robot's body, or e.g. utilizing a flexible OLED to wrap around a body part of the robot
C. A display that is projected from the robot onto a nearby surface, e.g. onto a floor or a wall, e.g. using a laser projector.
D. A remote compute device that includes a display such as a computer or a smartphone wherein information is communicated from the robot to the remote compute device through a data communications channel, such as Bluetooth, or the internet.

In some embodiments the robot may combine its knowledge of its current position, acquired as described earlier in this application, with knowledge from its map of the environment, acquired as described earlier in this application, to provide directions for navigating from the current location to a specified other location. This may be provided:
- A. On demand through a user interface, for example a person may ask where the front desk is and the directions may be provided in response;
- B. On a continuous basis, for example a robot may be deployed to continuously display the route to a particular restaurant;
- C. On a timed basis, for example a robot may be programmed to deploy itself every morning from 6 AM to 9 AM to display the route from the elevator to the front desk.
- D. Based on past requests. For example if the robot's software notices that there are many requests from 6 AM to 9 AM to display the route from the elevator to the front desk, the robot may deploy itself autonomously in those hours providing that map. This decision to deploy may be executed based on many techniques known to those skilled in the art of big data analysis, for example a regression of time of day versus route request may be made wherein any route/time combinations that are more popular than a particular threshold may trigger autonomous positioning. Other techniques that determine correlation to many more variables are available, including for example training a neural network using supervised learning with input nodes representing actual historical requests along variables that are likely to correlate with the request such as time of day, day of week, time of year, which trade show if any is currently in the hotel, etc.

In some embodiments directions may be given by physically leading a person or people to their destination, optionally combined with showing the route on one or more displays as described herein.

Physically leading a person may be triggered by the following:
- A. A request by a person to be led to the destination using a User Interface, such as voice recognition. This may be in response to a prompt by the robot on its User Interface, such as the robot verbally asking "Would you like me to lead you there?".
- B. The complexity of the route exceeding a threshold. For example if a route has more than two turns the robot may lead the person. In some embodiments the robot may indicate that it is to lead by providing indication through a user interface, such as a voice interface wherein the robot states "I'm going that direction anyway, just follow me".
- C. Based on priority of tasks. In this embodiment the robot maintains a list of tasks to be performed. Leading a person who did not make a request to be led may have a priority assigned to it. If no other task on the list exceeds the priority of this action this action could be performed. Leading a person who did make a request to be led may also be assigned a priority, in a preferred embodiment this priority would be higher than leading someone who did not make a request. In some embodiments the priorities may be adjusted based on physical characteristics of the person that directions are provided to, for example a person in a wheelchair may be assigned a higher priority than a person who is not.

In some embodiments directions are given by physically pointing using a part of the robot. In one preferred embodiment the pointing is provided by rotation of the robot's body in the direction that the person is to go. In another preferred embodiment directions are given by stretching an arm, hand, and/or fingers in the direction the person is to go. These methods of providing directions may be combined with each other and with the other methods described herein.

In some embodiments the one or more displays show directions to the destination. In some embodiments the current position, destination, and best route are shown on the one or more displays. In a preferred embodiment the information may be projected onto the floor in the same orientation as the current room is within the map. For example if a person requests the route to the men's room, the robot may project a map of the area of the building that includes the current location and the men's room onto the floor in front of the robot. This display may include a set of arrows that indicate how to navigate to the men's room.

In some embodiments landmarks within the room may be included on the map. For example a sculpture or piece of furniture may be included in the map in a photorealistic detailed fashion so that the map appears to be a miniature version of the current room.

In some embodiments the robot and/or the person making the request may be included in the map. Other dynamic objects such as people, strollers, luggage, etc may also be included in the map. In some embodiments these objects may be tracked real-time, such that as they move in the real world they also move in the map.

In some embodiments the robot may be animated in the map, such that e.g. if the robot moves its arm, the representation of the robot in the map moves its arm in an identical manner.

In some embodiments one or more dynamic objects such as people may be represented in the map in a representative way, for example their clothing may be shown in the correct colors and/or positions of arms and legs may be represented in the map as they are in the real world. In a preferred embodiment a camera is used to collect real-time images of the dynamic objects such as people, and these images are may be texture-mapped onto the representation in the map. Texture-mapping is a standard graphics technique and is well known to those skilled in the art.

In some embodiments the robot may include a multipurpose compartment or shelf. A module may be placed within this compartment or on this shelf based on the functionality that is needed from the robot at a particular time. In some embodiments the robot may accept multiple modules simultaneously. Types of modules may include zero, one, or more of the following:
- A. A module that includes tools, for example cleaning tools such as scrub brushes, buckets, and/or sponges.
- B. A module that includes user interface elements, such as a keyboard, or a display. A preferred embodiment may include a laser projector that includes the ability to steer its output to a wall or a floor.
- C. A module that includes a key card programmer and/or dispensor. In a preferred embodiment the module may be designed so that the robot arm could physically reach a card that has completed its programming, so that the robot could grasp the card for giving to a person or placing in a particular spot, such as on a table. In some embodiments the robot may take a card from a first position e.g. where the blank cards are kept, place the card in a second position for programming, and move the card to a third and final position, such as on a table or into a person's hand.

D. A module that provides controlled environmental conditions, such as humidity or temperature. These may include zero or more of the following:
  i. Refrigerator or freezer. In a preferred embodiment this may be used to transport food, such as an ice cream sandwich. In a preferred embodiment the robot arm could physically reach objects within the refrigerator or freezer and utilize grasping as described elsewhere in this application to remove a single item. In some embodiments the robot may place this item in a particular spot, such as a table, or give the item to a person, for example giving an ice cream sandwich to a child.
  ii. Warming compartment or oven. In a preferred embodiment this may be used to transport food, such as a slice of pizza. In a preferred embodiment the robot arm could physically reach objects within the warming compartment or oven and utilize grasping as described elsewhere in this application to remove a single item. In some embodiments the robot may place this item in a particular spot, such as a table, or give the item to a person, for example giving a slice of pizza in a box to a person.
  iii. Controlled humidity compartment. This could carry e.g. cigars or other items that are sensitive to humidity.
E. A storage compartment for a person to open. In some embodiments the storage compartment may be locked. The compartment may be unlocked using zero or more of the following techniques:
  i. A key;
  ii. A code;
  iii. Using a mobile app on the phone of the intended recipient that unlocks the storage compartment by displaying a code on the phone's screen that is read by a sensor on the robot.
  iv. Using a mobile app on the phone of the intended recipient that uses a wireless communications channel such as Bluetooth to send an authorization code.
  v. Geolocking. The compartment may unlock based on the location of the robot, for example when the robot is within a particular guest room.

In some embodiments a sensor determines when a task is to be done. Sensors could include:
  A. In a storage room when the quantity of a particular item is below a minimum. The quantity could be sensed using weight, height, or using a camera. In a preferred embodiment the quantity is may be sensed using a camera that is on the robot, with the quantity being determined using techniques of machine vision as known to those in the art.
  B. When dirtiness is detected. Dirtiness could include films of unwanted material, such as soap scum, or an unwanted item, such as a hair or a gum wrapper. This may be sensed using zero or more of the following techniques:
    i. Using a camera with image processing as known to those familiar with the art. In a preferred embodiment utilizing deep learning.
    ii. For films, using a detector of the materials signature, such as the spectrum as seen by a hyperspectral camera or through a ramen spectrometer.
    iii. For unwanted items using a difference between a map of the area when no unwanted items are present and a map of the area when unwanted items are present.
  C. When a maintenance task is required. For example a sensor could detect when there is a chip in the paint on a wall or when caulk or grout is discolored, missing, or cracked.

In some embodiments when the sensor determines a task is to be done, a task is added to a list of tasks to be done along with a priority. The priority may be preset based on the type of task, for example restocking a shelf may always priority 2, or may be adjusted based on other parameters, for example if stock level is below 10% restocking a shelf is priority 5, otherwise it is priority 2.

In some embodiments the robot may perform tasks in priority order.

For restocking a shelf the task may be to go to a first location, pick up the item that is required, and then go to a second location, and place the item into a position, such as on a shelf.

For areas that are determined to be dirty the task may be one or more of
  A. Clean the area.
  B. Provide an alert that the area is dirty.

For areas that are determined to require maintenance the task may be one or more of performing the maintenance and/or providing an alert that the maintenance is required.

In some embodiments robots assist with check in of hotel guests.

In some embodiments an interface is provided from a system that knows when a guest is expected to arrive, for example from a mobile app that the guest has completed a check in process on. Optionally a real-time indication of position of the guest may be provided, for example by a mobile app on the guest's phone using GPS to track the position of the guest.

In some embodiments at the time the guest is expected to arrive a robot may wait in a specified place, such as in the lobby or in front of the hotel, for the guest.

In some embodiments the robot may display the name of the guest so that the guest knows that this particular robot is intended to interact with the guest.

In some embodiments a group of robots may be provided for interaction with the guest, and the guest may interact with any of them.

In some embodiments the identity of the guest may be verified, through zero or more of the following means:
  A. Biometric identification;
  B. A passcode;
  c. Interface with a mobile app on the guest's phone, such as through a code on the display or through Bluetooth;
  D. By answering a set of questions.

In some embodiments after the identity of the guest is verified one or more actions may be taken by the robot. These may include:
  A. Providing a room key or key card;
  B. Leading the guest to their room;
  c. Taking the guest's luggage;
  D. Providing an item or a service, such as a welcome drink, or instructions on how to perform a task such as check in for a conference.

Use of language such as "at least one of X, Y, and Z" or "at least one or more of X, Y, or Z" are intended to convey a single item (only X, or only Y, or only Z) or multiple items (i.e., {X and Y}, {Y and Z}, {X and Z}, or {X, Y, and Z}). "At least one of" is not intended to convey a requirement that each possible item must be present.

Fluid Deposition

Figure 9:
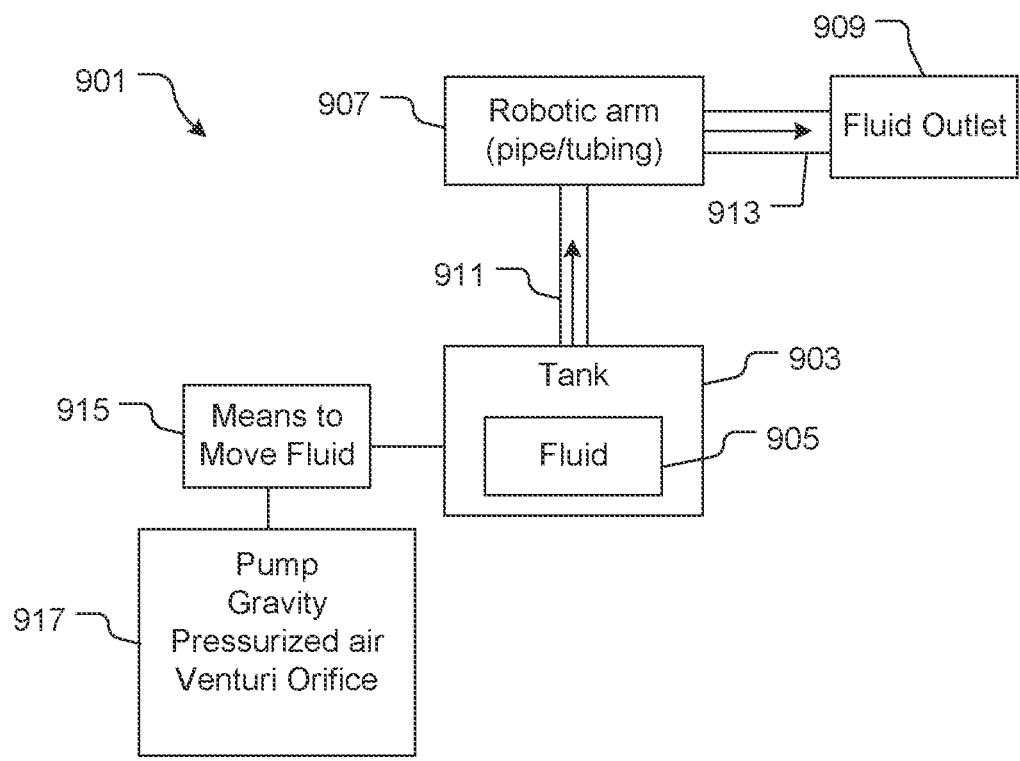
FIG. 9 is a schematic of a fluid dispensing system for use with a robot of the present invention.

As shown in FIG. 9, some embodiments of the present invention can include a fluid system 901. This system can include a tank 903 transported by the transportation system, the tank 903 holding a fluid 905 therein, wherein the fluid may be a cleaning solution, water, or other fluid. The tank 903 is in fluid communication with the robotic arm 907 and a fluid outlet 909 via one or more pipes 911, 913. During operation, a means to move the fluid 915 will be utilized to push the fluid from the tank to the fluid outlet. The means may include any means known in the art 917, such as one or more of a pump, gravity, pressurized air, or a venturi orifice.

In a preferred embodiment a fluid outlet is near the distal end of the robotic arm and in a preferred embodiment the fluid outlet is a spray nozzle.

In some embodiments the fluid flows through pipe or tubing that is embedded in the robotic arm. In a preferred embodiment the tubing is flexible tubing which is routed through a loop co-located with each joint in the robotic arm. In another embodiment the fluid is fed through rigid pipes or passageways embedded in the robotic arm, with swivel connectors at each joint of the robotic arm. Some embodiments may use a combination of flexible tubing and rigid tubing with swivel connectors.

In some embodiments the fluid flows through pipe or tubing that is routed through the conveyer via a service loop. In a preferred embodiment the fluid is routed within a cable chain incorporated in the conveyer.

In some embodiments multiple pipes and/or tubes within the robotic arm and/or the conveyer move different fluids. In some embodiments a single pipe and/or tube may carry multiple fluids as described below.

A fluid outlet may be a spray nozzle, an air injection unit for foaming, a solenoid controlled valve, or any of a number of other types of outlets known to those in knowledgeable in the art of fluid deposition. One or more fluid outlets may be present. Different fluid outlets may e.g. be spray nozzles with different flow rates, spray patterns, or may work together to achieve some desired pattern of liquid disposition.

The system may include one or more of the following systems to move the fluid: Pumps for moving the fluid. Gravity (wherein the fluid tank is higher than the outlet). Pressurized air within the tank to drive the fluid at pressure. Venturi orifice incorporating compressed gas. Or other means known to those in the art Which tank is actively providing fluid may be achieved as follows:

Individual tanks may each have their own pump. In this embodiment the output of the pumps may be connected together with a manifold that allows the fluid from those tanks with active pumps to flow fluid through a single tube or pipe to the robotic arm. In this embodiment an optional one-way valve may be installed to avoid backflow of fluid from one tank to others.

A fluid switch (which may be operated with a solenoid, a motor, pneumatically, or through other means known to those knowledgeable in the art) may select which tank is connected to the output tube. Fluid movement may then be actuated by any of the means discussed above.

In some embodiments the time that fluids are switched is adjusted for the latency time of the fluid to flow through the pipe and/or tube. For example if the desired output at 11:40:00 AM is 3 seconds of fluid A, then 2 seconds of fluid B, and then continuous stream of fluid A, and at the desired flow rate the latency time for the fluid to move through the tubes or pipes is 20 seconds, the fluids may be pumped such that at 11:39:40 flow of fluid A is started, at 11:39:43 the flow is switched to fluid B, and at 11:39:45 the flow is switched back to fluid A.

In some embodiments the flow of fluid is modulated using a solenoid or other controllable fluid actuator (such as a pneumatic switch, a peristaltic element, etc) that in a preferential embodiment is located near the fluid outlet. In these embodiments the solenoid or other controllable fluid actuator may be controlled by a controller which may command the output of pulses of fluid (e.g. through an electrical signal) to simulate fluid outlet types that are not present. For example, a spray nozzle designed for output of 1 liter per minute may act as a 0.5 liter per minute spray nozzle by providing 50% duty cycle through the solenoid or other fluid actuator, e.g. using pulse width modulation. For clarity this is different than reducing the pressure of the fluid. Many outlet devices, such as spray nozzles, perform well only within a narrow range of pressures. By periodically switching the flow between full flow and zero flow a lower flow rate can be achieved while retaining the design pressure of the outlet device.

In some embodiments the solenoid or other fluid actuator may be controlled to provide high accuracy fluid deposition by timing the release of fluid to coincide with an event, e.g. during a fast sweeping motion of the robotic arm releasing a burst of fluid at a particular position of the arm.

Surface Interface Object Changer

Figure 10:
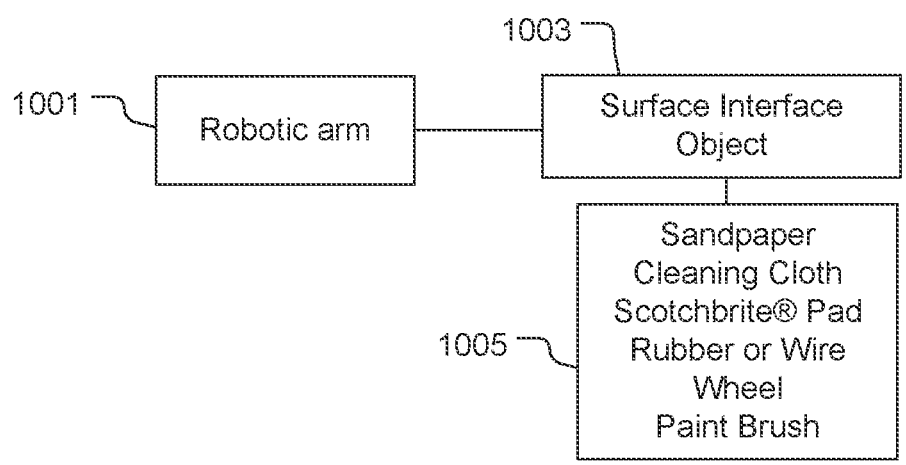
FIG. 10 is a schematic of a surface interface object system for incorporation with a robot of the present invention.

In some embodiments, the robot of the present invention may include the use of a surface interface object. As shown in FIG. 10, a robotic arm 1001 of the present invention may be configured to engage with one or more surface interface objects 1003, such as a piece of sandpaper, a cleaning cloth, a Scotchbrite™ pad, a rubber or wire wheel for surface cleaning, a paint brush, a compound object that includes multiple elements, such as a cleaning cloth with Scotchbrite™ on certain surfaces, other objects as are known to those knowledgeable in the art, 1005. It will be appreciated and understood that the robotic arm in this example can replace any of the arms discussed above and uses the teachings herein.

The surface interface object may interface with the surface in a number of ways: by being dragged across the surface, by being rotated such that parts of the object contact the surface due to centrifugal force, by being pressed into a surface, by being moved back and forth across a surface, other interface methods as known to those knowledgeable in the art.

In some embodiments the surface interface object needs to be replaced on a periodic basis. For example, a piece of sandpaper would need to be replaced with a new piece of sandpaper, a dirty re-usable cleaning cloth would need to be replaced with a clean one, etc.

In some embodiments of the present invention an automatic (i.e. doesn't require human intervention) changer for the surface interface object is included. In some embodiments a separate device for removal and a separate device for installation of a new surface interface object are included.

Figure 11:
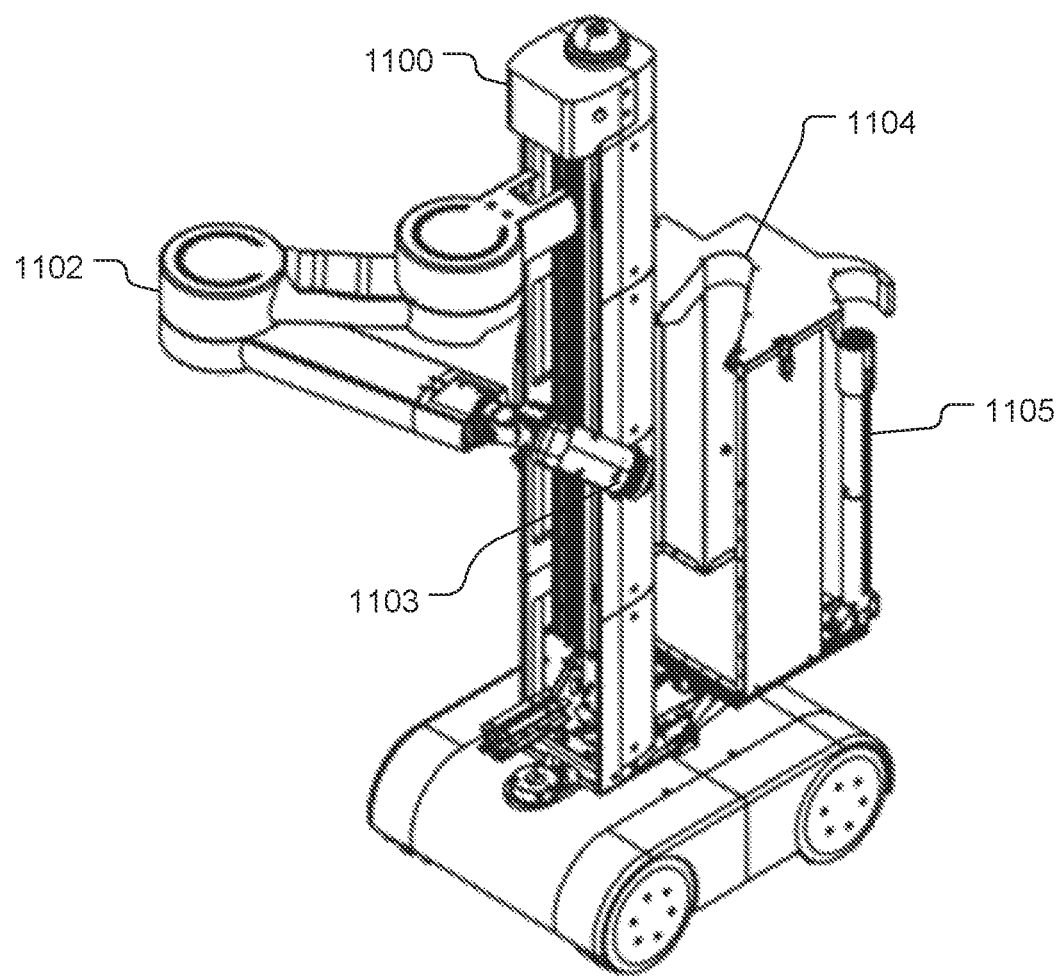
FIG. 11 illustrates one embodiment of a surface interface object remover and installer for incorporation with a robot of the present invention.

In FIG. 11, an exemplary embodiment of a robot 1100 with an automatic changer is shown. Robot 1100 including some or all of the features discussed above and including moveable robotic arm 1102 that has a range of motion that allows it to reach the surface interface object remover and installer. Further, robot 1100 includes a holder 1103 for surface interface objects and a surface interface object remover 1104 that includes a bin that can hold one or more surface interface objects, and a surface interface object installer 1105 that has a magazine that can contain one or more new surface interface objects.

With no surface interface object installed in the robot 1100 the robot arm 1102 is moved so that the surface interface object holder is in a position where it is inline with the surface interface installer 1105. The example surface interface object installer uses a screw to push a new surface interface object up into the surface interface object holder, but those skilled in the art will understand there are many ways to install a surface interface object, including in a preferential embodiment where the robot arm 1102 is moved down to engage the next surface interface object. In some embodiments, such as the one illustrated, two or more fresh surface interface objects are held by the installer for installation in the holder for use in successive cycles of installation of fresh surface interface objects.

When the surface interface object is ready for release, the robot arm 1102 may be moved to be inline with surface interface object remover 1104. The example surface interface object remover uses a servo to press on a center button in the surface interface object holder to release the surface interface object, whereupon in the example it is able to fall into a bin that can hold 1102 or more used surface interface objects. Those skilled in the art will recognize that there are other ways to release a surface interface object including:

Physical features anywhere within the holder that can be physically actuated to release the surface interface object.

Magnets (electro-magnet or fixed magnet) that release the surface interface object upon the application or removal of a magnetic field.

Sound-based systems for removal, ultrasonic or otherwise.

Systems that are based on data communications such as Bluetooth to give a command to a module included in the surface interface object holder to release the surface interface object.

Rotating the surface interface object holder such that the surface object may unscrew or releases through some other means.

Prying the surface interface object to release it. In a preferred embodiment the surface interface object is held by the surface interface object holder through Velcro or other passive means (friction, etc.) wherein surface interface object may be pried off for example using a fork that is forced between the surface interface object holder and the surface interface object through the motion of the robotic arm.

Other means known to those knowledgeable in the art.

Figure 12:
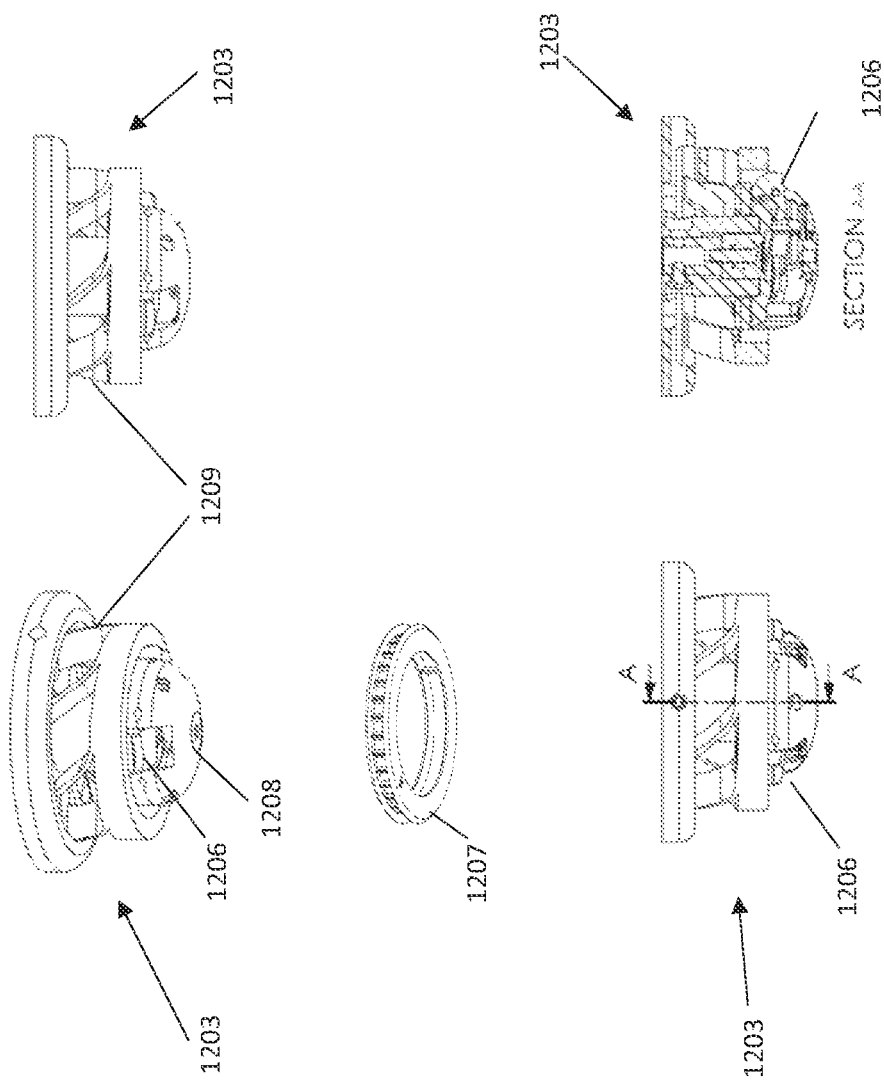
FIG. 12 illustrates a surface interface object holder for use with a robot of the present invention.

In FIG. 12, an example of an interface object holder 1203 is shown. The surface interface object holder 1203 in this example has a set of spring loaded pawls 1206 that engage with a ring 1207 that is permanently attached to each surface interface object. In this embodiment pressing the ring 1207 into the holder 1203 engages the pawls on an inside lip of the ring. Pressing center button 1208 releases the pawls and spring 1209 pushes the ring and the attached surface interface object off of the holder 1203.

Fusing Multiple Maps for Localization Based on a Robot with 2 or More Distance Sensors Covering the Same Area Techniques to allow a device such as a robot, mobile phone, or other device to determine its position within a space is well known to those knowledgeable in the art. One class of technique uses a distance sensor that can see positions of the nearest obstacle in a number of directions, such as a rotating 2D LIDAR or a 3D LIDAR or a radar.

These techniques use statistical methods to determine the location of the device. There is inherent uncertainty in the location that these methods report. These techniques may build a map simultaneously with localization within the map (SLAM-Simultaneous Localization And Mapping) or may find a position, i.e. "localize", within an existing map.

In some applications a map exists that represents an idealized or inaccurate representation. For example, the inside of a building may be represented with a map that is formed from the blueprints, but the actual interior of the building may have walls or other features that vary from the blueprints by an inch or more. Another example of an idealized or inaccurate representation would be a space that is meant to be repeated in an identical manner, such as the bathrooms in guest rooms in a hotel. Building a map from a one guestroom bathroom gives an approximate map that may be used in other theoretically identical guest room bathrooms, but in practice features within these rooms may vary by several inches from the one guestroom bathroom. If a device tries to localize using the idealized or inaccurate map there will be inaccuracy in the localization position introduced, likely on the order of the variance of the actual space from the idealized map.

In some robot applications a set of actions are desired that are to be performed with motions that are relative to a portion of the space that the robot is operating in, for example a robot arm may be programmed to wipe a countertop, and the trajectory of the robot arm must be correct relative to the countertop for the process to be successful. In these applications accurate positioning of the robot may be very important for quality of performance of the task by the robot.

Figure 13:
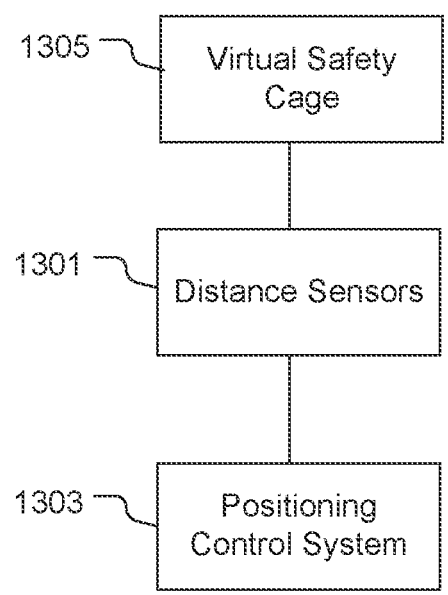
FIG. 13 illustrates a schematic of the use of one or more distance sensors in accordance with the present invention.

In FIG. 13, a schematic depicts the use of one or more distance sensors 1301 with the positioning control system 1303 of the present invention. The distance sensors are used to determine motions of the robot.

In one embodiment of the present invention a set of motions may be created for a robot or robotic arm or robotic arm on a mobile base relative to a map for a first space. In this embodiment the set of motions are applied to a second space that has a similar layout to the first space, but may have variance due to construction variation or other factors. In this embodiment a first map is created of the first space and a second map is created of the second space. In this embodiment while located within the second space the robot simultaneously performs localization algorithms on both the map of the first space and the map of the second space. The robot's position is taken to be a combination (e.g. a weighted average) of the position determined through localization in each of the two spaces. This technique allows greater accuracy in applying the set of motions designed for the first space to the second space.

Those knowledgeable in the art can modify their localization algorithms to give greater or lesser weighting to some distance measurements so that they have a larger or smaller effect on determining the location of the device. In an embodiment of the present invention a map of the first space includes labels that match labels of particular motions. For example a portion of the first map could be labeled "sink", and any motions associated with wiping the sink could also be labeled "sink". In some embodiments of the present invention localization would give a higher weight to points that are labeled with a particular label while performing motions with the same label. For example localization could give higher weight to points on the sink while performing robotic arm motions that are labeled "sink". This would have the effect of the robot in the second room positioning itself most accurately relative to the sink, resulting in wipes in the second room having a more accurate trajectory across the sink even if the trajectory was programmed in the first room.

Automated Floor Planning

In some embodiments a robot is required to move from position to position and perform a task at each position. In some embodiments the robot uses a robotic arm to perform this task, and the arm has a certain amount of area that it can reach from each position of the robot.

In some embodiments a software planner program determines the positions the robot should take along with the associated arm motions that the robot should perform at each position.

In some embodiments the overall goal is to cover an entire surface using a robotic arm with a surface interface object such as sandpaper or a scrub cloth at the distal end of the robotic arm. In some embodiments the goal is to cover the entirety of the surface in minimum time and with maximal coverage.

In some embodiments the software planner may include a model of the coverage of the surface interface object, for example the surface interface object may cover a swath of 10×8 inches when held in a particular orientation or cover a swath of 4×6 inches when held in a different particular orientation. The software planner may plan a back and forth boustrophedon pattern for the robotic arm to cover the entirety of the area that may be reached from a single position of the robot's base.

Many robotic arms are capable of reaching a particular position in multiple ways. For example a particular robotic arm that is 3 feet long may reach a point that is 2 feet away by bending its elbow in either one of two different directions. Each possible set of joint angles that reach the same final robot arm position are called a configuration. So in the previous example the arm could use one of two configurations to reach its position 2 feet away. The position of the end of the arm is identical in each of these two positions. However, for a sequence of robot arm positions (this is known as a trajectory) a particular starting trajectory may allow reaching more points than another starting trajectory. It is often possible to switch the arm configuration, however that requires extra time and sometimes is not possible because of obstacles.

In some embodiments a trajectory is calculated to create maximum coverage of a space for a surface object interface from each of a number of robot base positions. Each of these trajectories may include configuration changes so that when the arm finishes covering the region accessible from one starting configuration it changes configuration and covers a region that is only accessible based on that configuration. For each robot base position a trajectory may be calculated for two or more possible starting arm configurations. Starting arm configuration, coverage area, time required for the trajectory, and ending arm configuration for each robot base position may be stored in a database.

An optimizer may use this database to find the optimal set of robot base positions and arm starting configuration from each robot base position chosen. For example if 10 robot base positions 1 through 10 each had two trajectories, A and B with different starting arm configurations, the optimizer could use the database to determine the optimal set of base positions. For example it might be optimal to start at robot base position 2 with starting arm configuration A, followed by robot base position 5 with starting arm configuration B, followed by robot base position 8 with starting arm configuration A resulted in complete coverage of the space in the minimum amount of time.

In some embodiments additional trajectories may be created for different orientations of the surface object interface that have different shape contact areas. In this embodiment the additional trajectories may be stored in the database. Expanding on the example above each of the 10 base positions may have 4 trajectories calculated, A and B may be two different starting arm configurations with a first surface object interface orientation, and C and D may be two different starting arm configurations with a second surface object interface orientation. The optimizer may pick the best combination of positions 1 through 10 with trajectory options A through D for each base position.

In some embodiments additional constraints may be considered. An optimal solution may be determined by a merit function (for example least mean squares) that combines all of the important factors. Additional factors that may be included in the merit function may include but are not limited to:

The robot not driving over an area that has already had a trajectory occur over it (for example if the action performed during the trajectory is cleaning, this would be a constraint not to drive over an area that is wet from cleaning fluid).

Order of operation (for example one area may need to be acted upon before another is, for example cleaning a countertop before cleaning a toilet with the same cleaning pad).

Overlap.

Skipping an area.

Virtual Safety Cage

Safety is a very important issue in robotics. It is common in industrial robotics to have a physical safety cage around the robot so that a person cannot get within the working range of the robot.

A physical safety cage is impossible for a mobile robot that is working outside an industrial setting, such as in a home, an office, a school, a hotel, etc.

In some embodiments of the present invention the robot may include a virtual safety cage 1305. In this embodiment the one or more distance sensors 1301 (such as a 2D or 3D Lidar) may be used, as shown in FIG. 13. In this embodiment when the distance readings match the expected values for the map of the room, the robot is allowed to operate normally. In some embodiments the existence and position of the unexpected objects is determined by creating a map of current distance readings and deleting any readings that are within the contours expected from the current map. Any remaining points or lines in the map represent unexpected objects. If distance readings show some objects closer than expected (by more than an allowed error or noise margin) the safety cage may be considered to be breached and appropriate action might be taken, such as stopping all motion of the robot.

In some embodiments of the present invention the velocity of objects is considered such that any object that if it continues on its present trajectory would be within the virtual safety cage within time t the safety cage is considered to be breached.

In some embodiments data from multiple distance sensors are fused, and the fused data is used to determine if the virtual safety cage is breached.

The embodiments illustrated and discussed in this specification are intended only to teach those skilled in the art the best way known to the inventors to make and use the invention. Nothing in this specification should be considered as limiting the scope of the present invention. All examples presented are representative and non-limiting. The above-described embodiments of the invention may be modified or varied without departing from the invention, as can be appreciated by a person with ordinary skill in the art in light of the above teachings. It is therefore to be understood that, within the scope of the claims and their equivalents, the invention may be practiced otherwise than as specifically described.

The particular embodiments disclosed above are illustrative only, as the embodiments may be modified and practiced in different but equivalent manners apparent to those skilled in the art having the benefit of the teachings herein.

It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed is:

1. A robot, comprising:
   a transportation assembly;
   a base with a plurality of wheels;
   a robotic arm attached to the base;
   an imaging system secured to the robot;
   a positioning control system configured to communicate with said transportation assembly to provide commands to said transportation assembly such that said robot moves to at least one of a plurality of stations at which a task is to be performed or along a path during said task;
   a robotic arm control system configured to communicate with said robotic arm to provide commands to said robotic arm such that said robotic arm performs a series of operations to complete a task specific to a particular one of said at least one of said plurality of stations or along said path;
   a holder attached to the robotic arm and is configured to engage with a surface interface object, a surface interface object remover, and a surface interface object installer;
   wherein the surface interface object remover is configured to remove a used surface interface object and the surface interface object installer is configured to attach a new surface interface object; and
   wherein the imaging system is configured to capture images of a room during completion of the task.

2. The robot according to claim 1, further comprising:
   a fluid transportation system, having:
      a tank carried by the transportation assembly, the tank holding a fluid;
      one or more pipes extending from the tank and through the robotic arm to a fluid outlet at a distal end of the robotic arm; and
      a means to move the fluid from the tank to the fluid outlet.

3. The robot according to claim 1, further comprising:
   one or more distance sensors in communication with the positioning control system to provide data for location and movement of the robot.

4. The robot according to claim 3, further comprising:
   a virtual safety cage created through operation of the one or more distance sensors.

5. The robot according to claim 1, further comprising:
   an on-board computer configured to communicate with said imaging system, said positioning control system, and said robotic arm control system,
   wherein said on-board computer comprises a data storage device configured to store an image map of an area where a task is to be performed to provide a baseline of the area and structures in the area, without temporary obstacles and clutter due to an occupant of the room,
   wherein said on-board computer is configured to receive real-time image information of the environment of said robot from said imaging system and compare said real-time image information with said image map providing said baseline of said area and structures to identify obstacles and clutter, and
   wherein said on-board computer communicates with said positioning control system and said robotic arm control system such that commands to said transportation assembly and commands to said robotic arm take into account obstacles and clutter identified by said on-board computer.

6. The robot according to claim 5, wherein said on-board computer communicates with said robotic arm control system such that commands to said robotic arm moves said clutter identified based on machine learning techniques in order to complete the task.

7. The robot according to claim 1, wherein said robotic arm position control system is further configured to communicate with said robotic arm to provide commands to said robotic arm such that said robotic arm grasps a tool to perform said series of operations to complete said task specific to said particular one of said at least one of said plurality of stations or along said path.

8. The robot according to claim 7, wherein the one or more tools are removably engaged with one or more holders of said robotic arm via operation of a predetermined sequence, wherein the predetermined sequence directs the robotic arm to grasp the tool and return the tool.

9. The robot according to claim 7, wherein said tool is at least one of a vacuum, a broom, a toilet brush, a sponge, a wedge, a motorized scrubber, a rotating scrubber, a brush, an abrasive pad, a spray bottle, a hook.

10. The robot according to claim 1, wherein the robotic arm further comprises a gripper; and
    the robot further comprises a gripper control system configured to communicate with said gripper to provide commands to said gripper such that said gripper performs a series of operations to grasp an object in accordance with the task.

11. The robot according to claim 10, wherein the object is a cleaning tool.

12. The robot according to claim 10, wherein the object is an object identified by an imaging system.

13. The robot according to claim 10, wherein the series of operations to grasp an object comprises:
    determining an initial grasp;
    grasping the object; and
    adjusting the grasp based on motion of the robot.

14. The robot according to claim 10, wherein the robotic arm and gripper are configured to:
    grasp an object identified by an imaging system at a first position;
    move the object identified by said imaging system from the first position to a second position;
    grasp a tool and perform a task at the first position;
    grasp the object identified by said imaging system at the second position; and
    move the object identified by said imaging system from the second position to the first position.

* * * * *